(12) United States Patent
Iwami et al.

(10) Patent No.: US 6,750,905 B1
(45) Date of Patent: Jun. 15, 2004

(54) DIGITAL CAMERA STORING AND OUTPUTTING ENCRYPTED DIGITAL IMAGE DATA

(75) Inventors: Naoko Iwami, Machida (JP); Takeo Tomokane, Yokohama (JP); Tomohisa Kohiyama, Yokohama (JP); Tetsuya Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/365,837

(22) Filed: Aug. 3, 1999

(30) Foreign Application Priority Data

Aug. 4, 1998  (JP) ............................................. 10-220104

(51) Int. Cl.[7] ......................... H04N 5/228; H04N 11/00
(52) U.S. Cl. ................. 348/222.1; 348/552; 348/333.02
(58) Field of Search ............................ 382/100; 380/54; 348/222.1

(56) References Cited

U.S. PATENT DOCUMENTS

| | | | | |
|---|---|---|---|---|
| 5,321,749 A | * | 6/1994 | Virga | 380/18 |
| 5,499,294 A | * | 3/1996 | Friedman | 348/207 |
| 5,887,130 A | * | 3/1999 | Doi et al. | 395/186 |
| 5,930,369 A | * | 7/1999 | Cox et al. | 380/54 |
| 6,192,138 B1 | * | 2/2001 | Yamadaji | 382/100 |

FOREIGN PATENT DOCUMENTS

JP          10-108180        4/1998

* cited by examiner

Primary Examiner—Ngoc-Yen Vu
Assistant Examiner—Rashawn N. Tillery
(74) Attorney, Agent, or Firm—Mattingly, Stanger & Malur, P.C.

(57) ABSTRACT

An image pickup apparatus certifies unchanged image data by photographing a person using the image pickup apparatus. Two steps are carried out with the image pickup apparatus, coding image data and enciphering the coded image data, which includes changing the original data to encryption data. The enciphering also includes adding a watermark to the coded data. The coding of the image data and enciphering of the coded data are performed before the coded data is stored in a medium or is transferred to another device.

6 Claims, 27 Drawing Sheets

2901 image pickup device casing main body
2903 image
2902 display unit 3001 display
3002 normally displayed image

DIGITAL CAMERA STORING AND OUTPUTTING ENCRYPTED DIGITAL IMAGE DATA

BACKGROUND OF THE INVENTION

The present invention relates to image pickup and enciphering image data. In the past an image pickup apparatus was a camera that makes an image on film at the time of shutter pressing by chemistry.

Therefore, the image that was picked up was fixed on the film. A alteration was only added on the photographic printing paper to which an image is transcribed from the film and it was done to judge the addition of a alteration to the image by looking at a film.

SUMMARY OF THE INVENTION

The digital camera that accumulates in a medium, such as a hard disc, an image that was picked up has in recent years appeared instead of a film camera. A digital data does not need to be developed, and it is done to send digital data immediately by using data communication. Digital camera is fast spreading from the easiness ease of use. There is a problem of a difficulty of a judgment whether there has been alteration to an image.

Protection can be done so that the third party, without the authority of access, cannot alter data due to that enciphering in a conventional data protection technical. But, there was a problem of not being able to prevent a present the image data that was picked up from being altered, even when there is a right of authorship and a third party without a authority uses it.

A guarantee cannot be made against alteration to a data on the receiving side.

It is an object of the present invention to provide the image pickup that can certify an addition or alteration in image data by a photographing person in another person. The another person is for example, a receiver of image data.

An other object of the present invention is to provide an image pickup that can certify an addition or alteration of image data by an image data addressee in the photographing person and a third party.

To achieve the object, two steps are coding an image data & enciphering the coded image data(ciphering to change: original data to an encryption data). The enciphering includes adding a watermark to the coded image data.

The enciphering is done before the coded data is stored in medium or is transferred to another device, when the expression is changed.

Processing unit enciphers an image marked image data in the present invention in the image pickup equipment. Case of transmitted data to external equipment such as a client terminal, enciphered image data is transmitted. The processing unit calculates a check-sum of image data, adds the check-sum to image data, and then enciphers the image data that has the added said check-sum. As a result, an addition or an alteration by an image data of photographing person can be certified to the image data addressee.

As a result, an addition or alteration of image data by an image data addressee can be certified to the photographing person and a third party.

And this Invention Includes as Follows

A digital camera for receiving an optical image and outputting trusted digital image data, is comprising, an optical-electrical system having an optical input for receiving the optical image, and an optical-electrical processor responsive to the optical image and generating the trusted digital image data representative of a security image superimposed with the optical image. In the digital camera, said optical-electrical processor generates a enciphered digital image data as the trusted digital image data. In the digital camera, the trusted digital image data is a still image data. The digital camera is comprising a storing device connected to said optical-electrical processor, and storing the trusted digital image data. The digital camera is further comprising a display device connected to said optical-electrical processor, and displaying the trusted digital image data. The digital camera is further comprising a communication control device connected to optical-electrical processor, and transferring the trusted digital image data to an external device. In the digital camera, the trusted digital image data is displayed with a data showing falsification, if anyone falsified the trusted image data.

A method performed by a single apparatus is comprising receiving an optical image, and outputting trusted digital image data representative of the optical image. In the method performed by a single apparatus, said apparatus is digital camera. The method is further comprising optical-electrical processing of the optical image, and generating digital image data representative of security image superimposed with the optical image as the trusted digital image data. The method is further comprising, performing all of said steps prior to outputting or storing the trusted digital image data. In the method, said outputting step outputs a enciphered digital image data as the trusted digital image data. In the method, the trusted digital image data is a still image data. The method is further comprising, storing the trusted digital image data. The method is further comprising, displaying the trusted digital image data. The method is further comprising, transferring the trusted digital image data to an external device. In the method, the trusted digital image data is displayed with a data showing falsification, if anyone falsified the trusted image data.

A digital camera for receiving an optical and outputting trusted image data, is comprising an optical-electrical system having an optical input for receiving the optical image, and means for generating the trusted digital image data as representative of a security image superimposed with the optical image and prior to storing or outputting of any digital image data representative of the optical image.

System for receiving an optical image and outputting trusted digital image data, is comprising, means for generating the trusted digital image data as representative of a security image superimposed with the optical image and prior to storing or outputting of any digital image data representative of the optical image.

DESCRIPTION OF THE PREFERRED EMBODIMENTS

Figure 1:
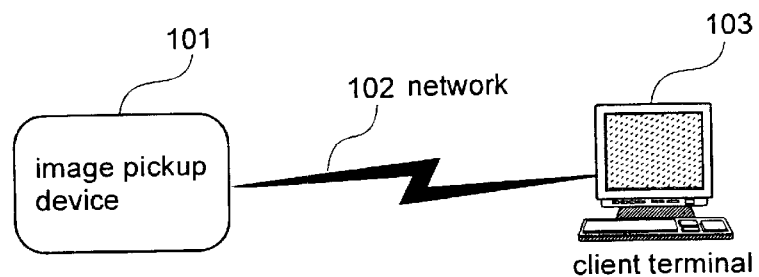
FIG. 1 is a system block diagram to implement the present invention.

A system to implement the present invention in FIG. 1 is shown. 101 is an image pickup apparatus storing digital data converted from picked up image data. 103 is a client terminal that receives a digital data from the image pickup apparatus 101 and does an image plane display, etc. 102 is a network that connects(or couples) the client terminal 103 and the image pickup apparatus 101. In case the acceptance of digital data by the client terminal 103 from the image pickup apparatus 101 is operated, the network 102 can be made to connect the client terminal 103 and the image pickup apparatus 101. When the client 103 does not operate to the image pickup apparatus 101, the image pickup apparatus 101 and the client terminal 103 may not connect to the network 102. The network 102 may be a cable to which the client terminal 103 and the image pickup apparatus 101 are connected directly. In addition, the network 103 may be a telephone network connected to other client terminals and equipment and an wide area network that is represented to an internet.

The image pickup apparatus 101 disconnected with other image pickup apparatus, and may receive an image data from the other image pickup apparatus. In addition, the image pickup apparatus 101 can be composed of a device that picking up an image and a device storing the picked-up digital data.

Figure 2:
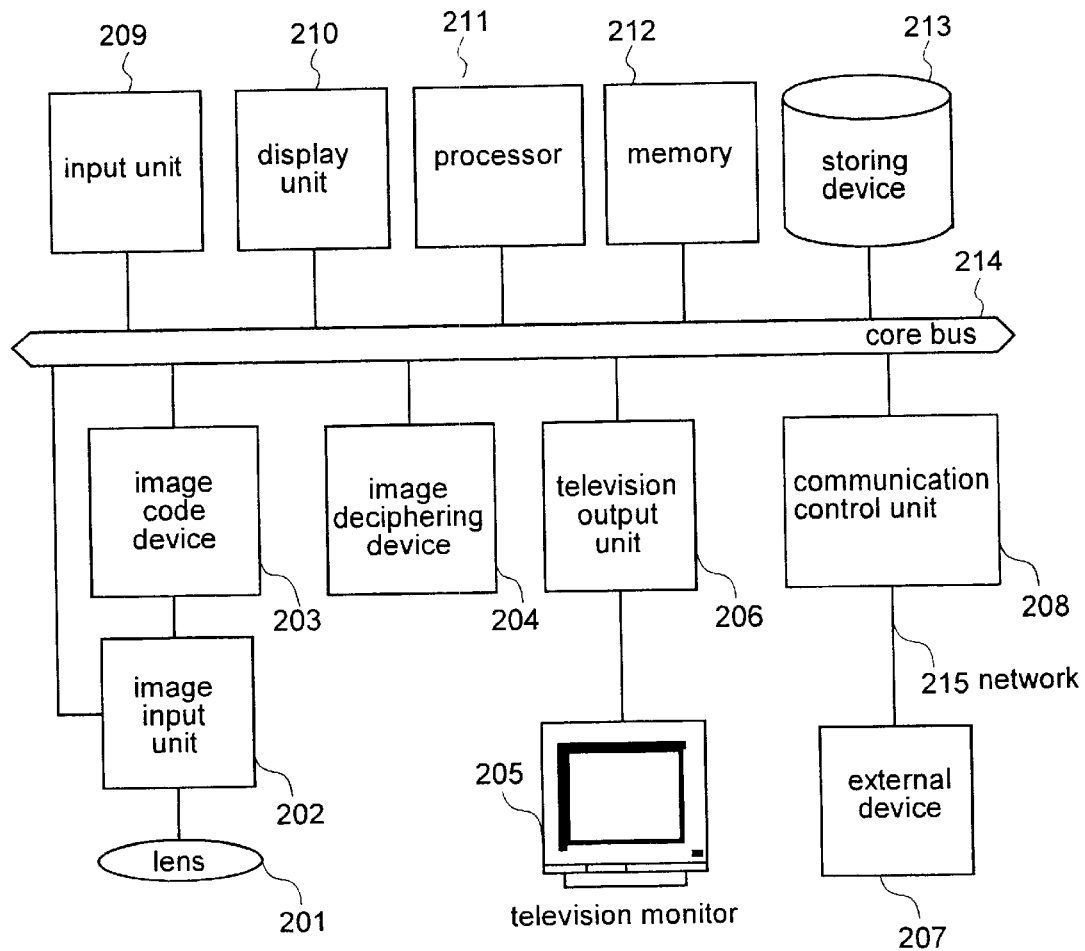
FIG. 2 is the block diagram of the image pickup apparatus.

The image pickup apparatus is shown in FIG. 2. The image input into image input unit 202 via lens 201 is input into image cipher device 203 according to instructions of a user input from input unit 209, enciphered, and accumulated to stock pile device 213. The lens 201 and the image input unit 202 are devices to be able to input the image to image pickup apparatus. So the lens 201 may be device has a same function as the lens and the image input unit 202 may be replaced by the other device 2. The image data enciphered and stored in a storing device 213 is input to image deciphering device 204 from an inputting device 209, and deciphered according to an instruction from a user of the image pickup apparatus by a program operating in processor 211. The coded image data is displayed on a display unit 210 and a television monitor 205 via television output unit 206. The image pickup apparatus is connected to an external device 207, such as the client terminal 103, via the network 215. A command received via a communication control unit 208 is read and is processed from the communication control unit 208 to a memory 212. The command created as it was processed is input into the communication control unit 208 and is transmitted to the external devices 207, such as the client terminal 103 via the network 215. The image code device 203, the image deciphering device 204, the television output unit 206, the communication control unit 208, the input unit 209, the display unit 210, the processor 211, the memory 212 and the storing device 213 are connected via a core bus 214.

It is not necessary to connect the communication control unit 208 to the network 215 in case the client terminal, etc. are not operated from the external device 207. The storing device 213 can be removed from the image pickup apparatus. It is not necessary that the television monitor 205 connects to the image pickup apparatus if it is not output to a television, and, the television output unit 206 can be omitted.

Figure 3:
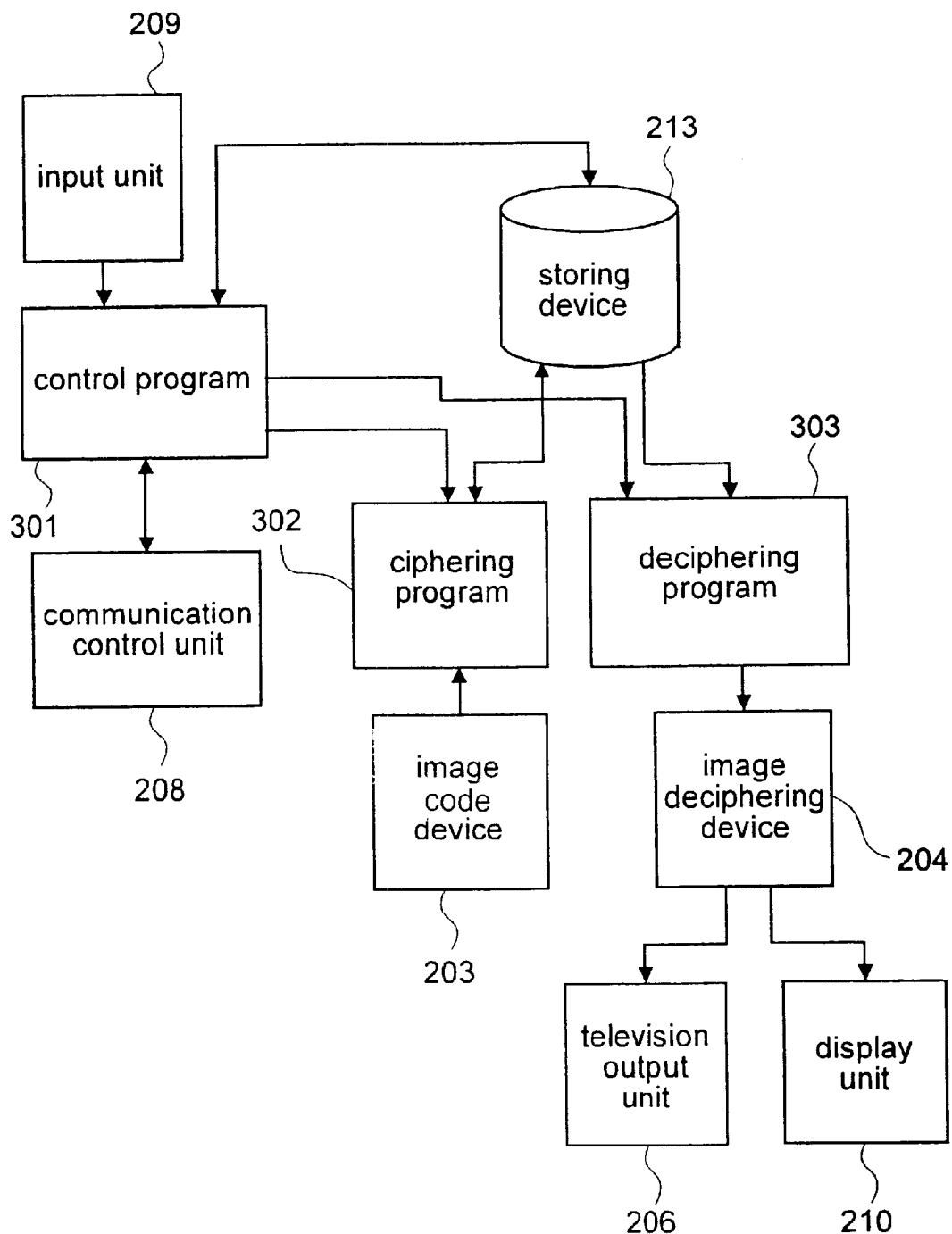
FIG. 3 is the block diagram of the control program that operates in the processor in the image pickup apparatus, an enciphering program and a cipher deciphering program.

The control program that operates in processor 211 of the image pickup apparatus is shown in FIG. 3, with an enciphering program and a cipher deciphering program. Elements 203–204, 206, 208–210 and 213 are the same as in FIG. 2. The control program 301 follows a command received from the communication control unit 208 and various setting are changed, an image data accumulated to the storing device 213 is deleted, and it is transmitted to the communication control unit 208.

The control program 301 initializes enciphering program 302, make a deciphering program 303 decipher an image data and outputs deciphered image data to the television output unit 206 and the display unit 210. The deciphering program 302 receives the image data from the image code device 203, enciphers the received image data, and stores enciphered image data in the storing device 213. The deciphering program 303 reads the stored image data from the storing device 213 and deciphers the read image data according to an instruction of the control program 301. The deciphering program 303 makes the image deciphering device 204 decipher the image data, and output the deciphered data to the television output unit 206 and the display unit 210.

Figure 4:
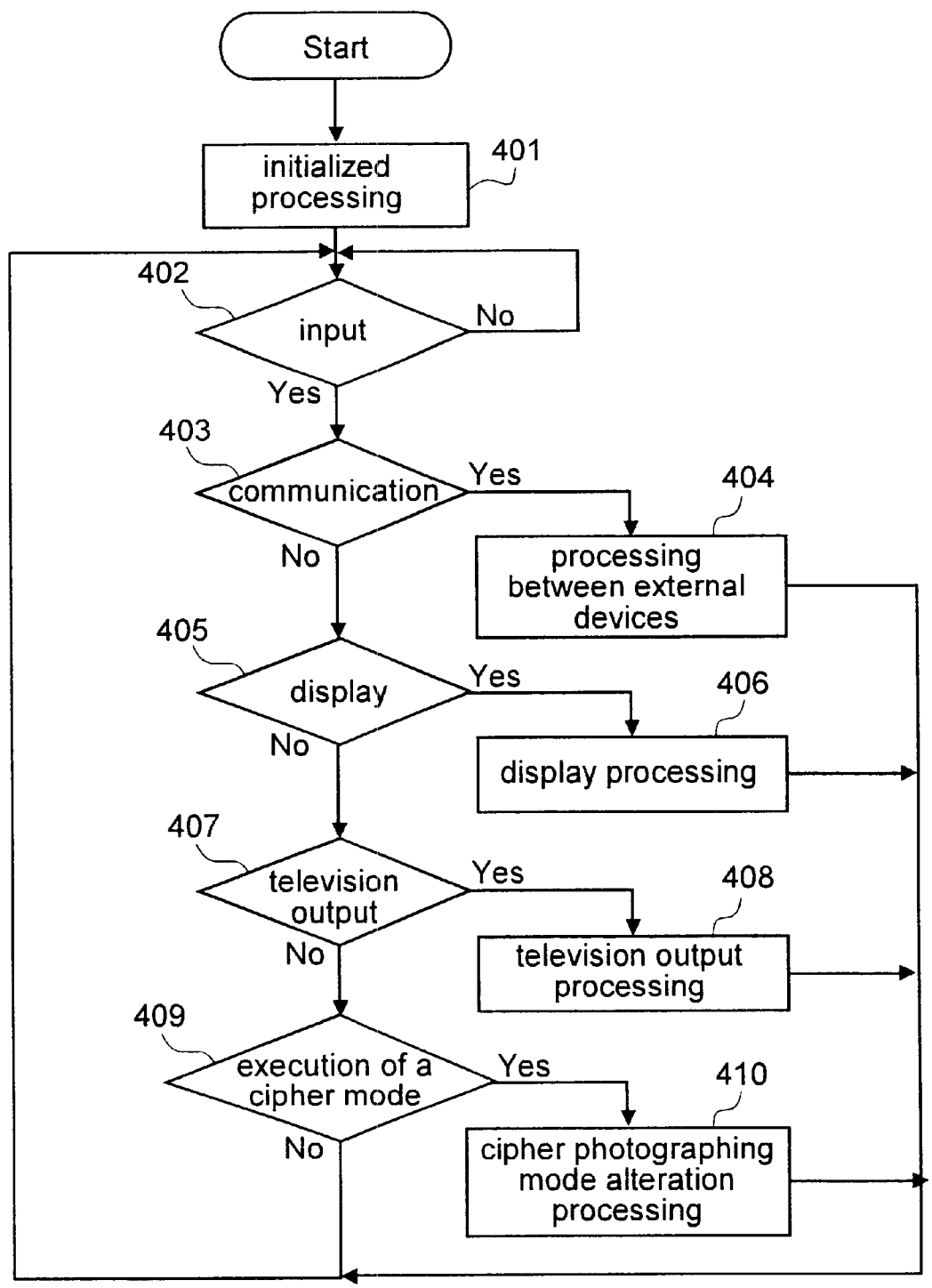
FIG. 4 is the flow-sheet of a control program in FIG. 3.

In FIG. 4, a flowchart of a control program on the image pickup apparatus is shown. Step 401 is initializing, and step 402 is waiting for an instruction by a user from the input unit 209. When there is the input from the user in step 402, step 403 judges an instruction input in that is then executioner of a communication with the external device 207. Therefore, in case it is execution of the communication, processing between external devices is done in step 404, and it returns to step 402 again. In step 403, when the instruction is not execution of a communication, it judges whether the instruction is display execution of the image to the display unit 210 in step 405. Therefore, in case it is a display of an image, display processing is done in step 406, and it returns to step 402 again. It is judged whether the instruction inputted in step 403 is execution output of an image in step 407. Therefore, in case it is the television output, the television output processing is done in step 408, and it returns to step 402 again. When the instruction is judged to be not television output, in step 409 it judges whether the instruction input in step 403 is alteration execution of a cipher mode. Therefore, in case it is the cipher mode alteration, cipher photographing mode alteration processing is done in step 410, and it returns to step 402 again. In case it is not a cipher mode alteration in step 409, it returns to 402 again. In case the image pickup apparatus does not have the television output unit, step 407 and 408 can be omitted. A cipher photographing mode can be made a fixation, and step 409 and step 410 can be omitted.

Figure 5:
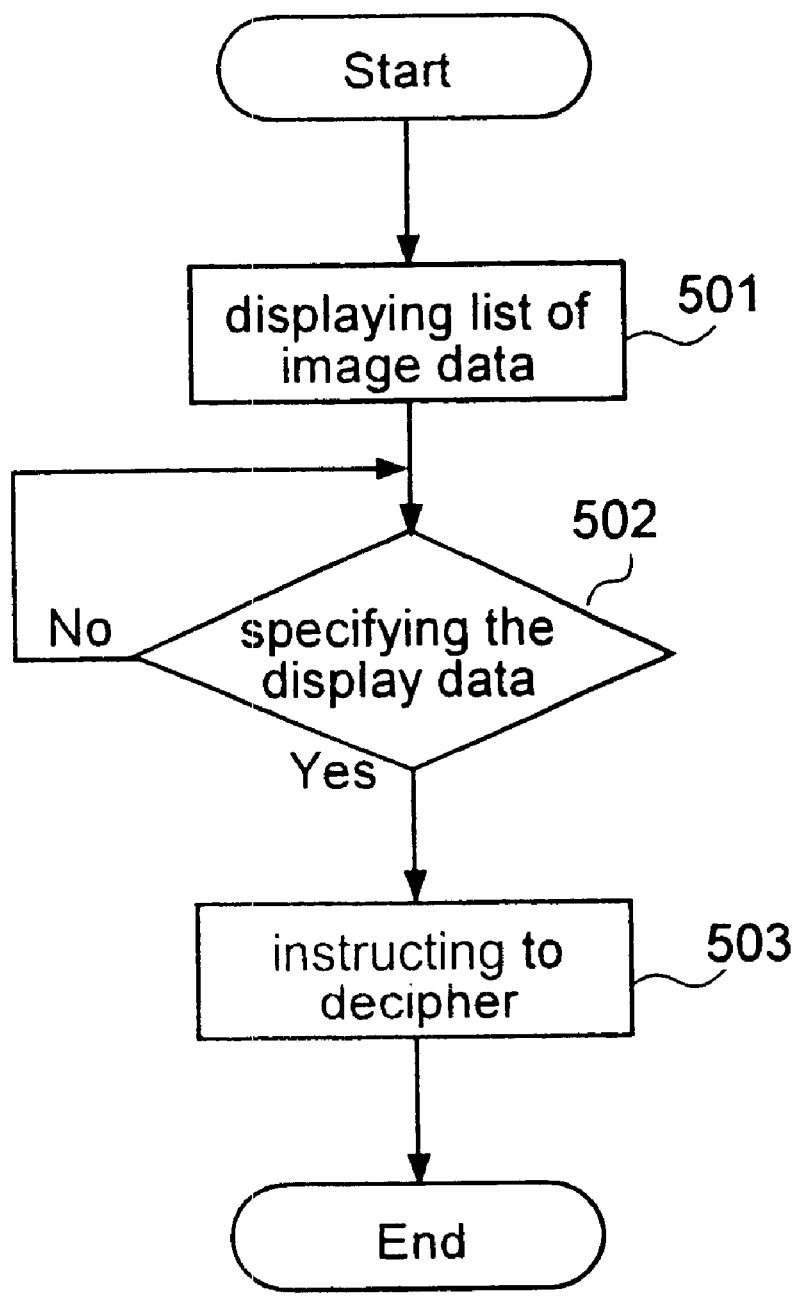
FIG. 5 is a flowchart of processing of a display in FIG. 4.

FIG. 5 is 1 flowchart of the display processing that is executed in step 406 in case the instructions that a user input in step 405 of FIG. 4 are display execution of an image. The list of an image data accumulated to the storing device 213 in step 501 is displayed on the display unit 210. It is indicated that it is deciphered, and the cipher of the image data specified in step 503 that judged whether it specified the image data that a user displays on 502 from the input unit displays it on a display unit to the deciphering program 302.

Figure 6:
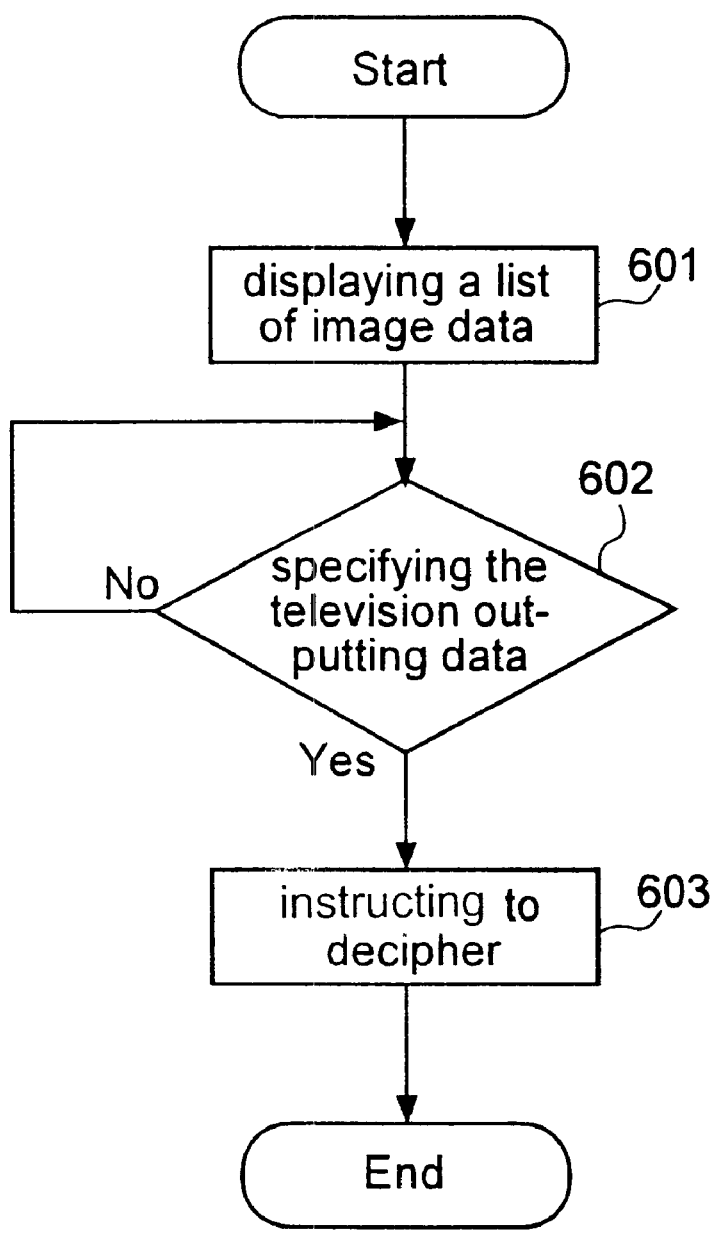
FIG. 6 is the flowchart of a television output processing in FIG. 4.

FIG. 6 is 1 flowchart of the television output processing that is executed in step 408 in case the instruction that a user input in step 407 of FIG. 4 are television output execution of an image. A list of an image data accumulated to the storing device 213 in step 601 is displayed on the display unit 210. In step 602, it is judged whether the user the image data that a user specifies an image data television outputted by the input unit. In case it is specified, the deciphering program 302 is it is instructed to decor the specified image data and to output it to the television output unit.

Figure 7:
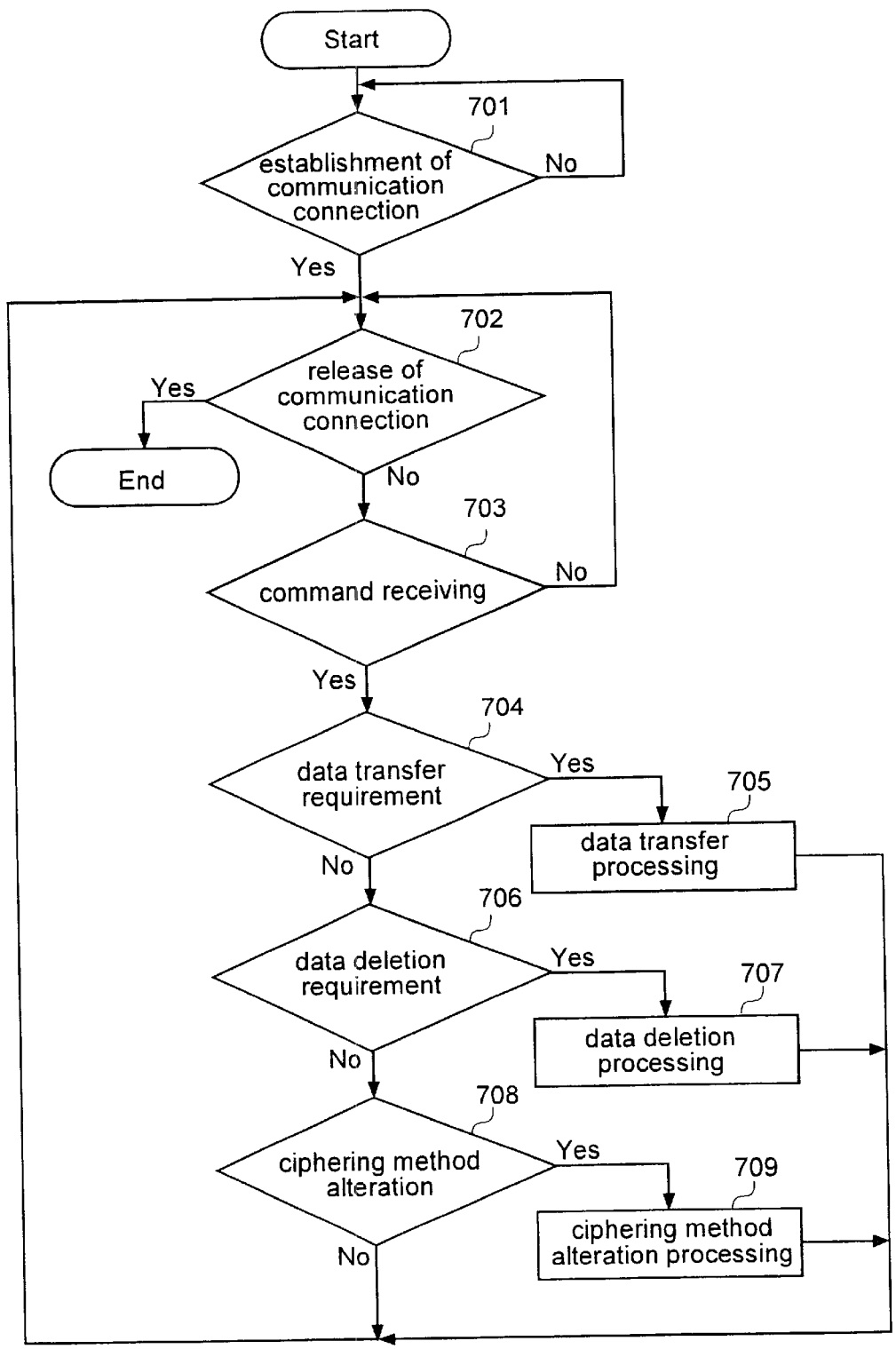
FIG. 7 is the flowchart of processing between external devices in FIG. 4.

FIG. 7 is 1 flowchart of processing between the external devices that are executed in step 404 in case the instructions that a user input in step 403 of FIG. 4 are communication execution with the external device. It is judged whether the communication connection settles in step 701 with the external device. When the communication connection settled, in step 702 it is judged whether the communication connection is released. In case the connection is released, the processing is ended. When the communication connection was not released in step 702, it is judged whether command is received from the external device in step 703. In case it is not being received, it is judged whether the communication connection is not released in 702 again. When command is received in step 703, it is judged whether the command is a data transfer requirement in step 704. In case it is the data transfer requirement, the data transfer processing is done in step 705. In case it is not the data transfer requirement in step 704, it is judged whether a command is a data deletion requirement in 705. In case it is the data deletion requirement, the data deletion processing is done in step 707. In case it is not the data deletion requirement step 706, it is judged whether the command is a cipher system alteration requirement in step 707. In case it is the cipher system alteration requirement, the cipher system alteration processing is done in step 709. In case it is not the cipher system alteration requirement, the processing against the command is not done in step 709. After data transfer processing step 705, data deletion processing step 707, or cipher system alteration processing step 709 is ended, and when it was not the cipher system alteration requirement in step 708, it is judged whether the communication connection with an external device was released in step 702.

Figure 8:
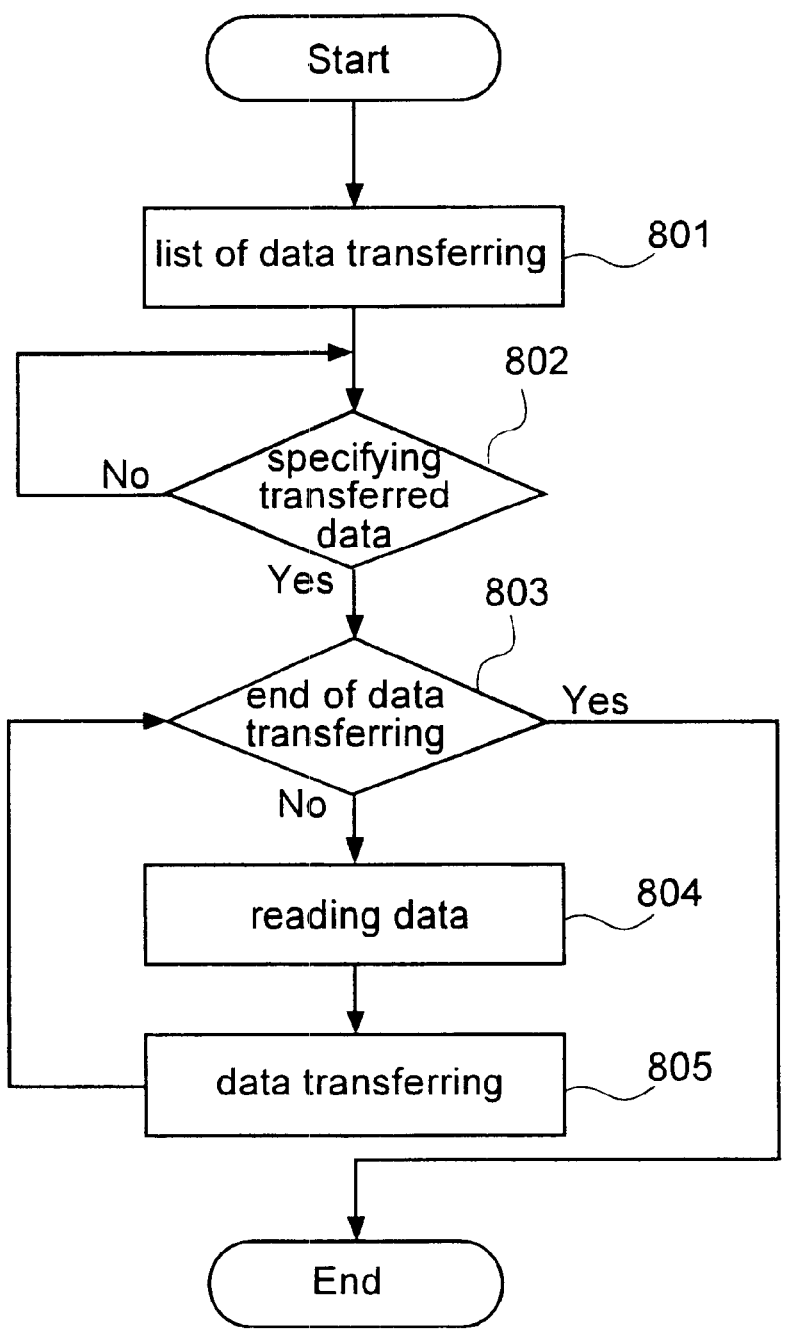
FIG. 8 is the flowchart of data transfer processing in FIG. 7.

FIG. 8 is 1 flowchart of the data transfer processing that is executed in step 705 in case a command received from the external device in step 704 of FIG. 7 is a data transfer requirement. In step 801, it is transferred a list of the image data stored in the storing device 213, and it is judged whether it was received a data specifying command transferred in step 802. Transmission of all data specified in step 803 and specified in the command after data specification command receiving ended or judged in step 802. Transmission of all data that was made a data command in step 805 and was specified in the command again after transmission that read the data that was transmitted to the following in step 804 from the accumulation equipment when it did not end ended or judged in 803.

In case the transfer of all data ends in step 803, processing is ended.

Figure 9:
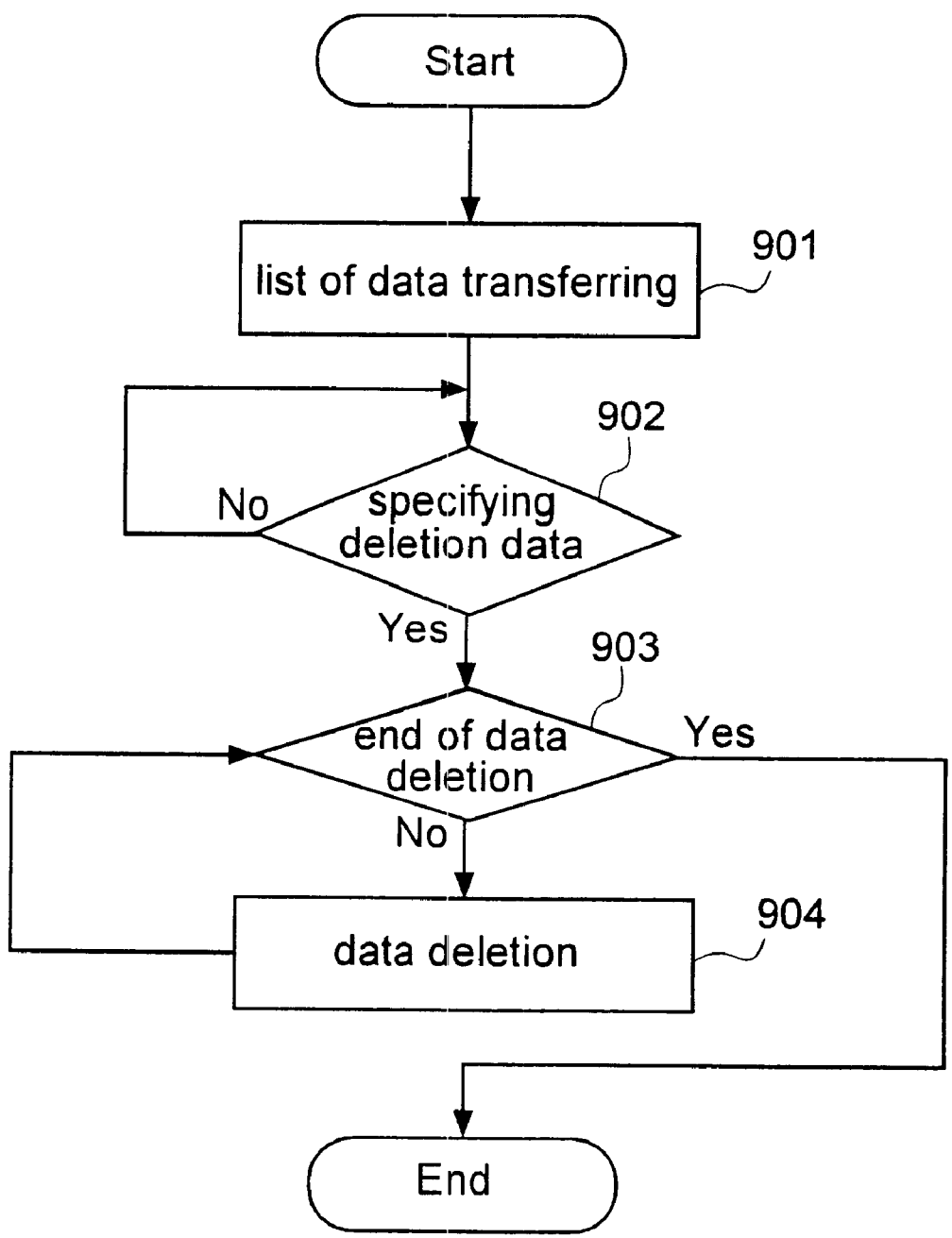
FIG. 9 is the flowchart of data deletion processing in FIG. 7.

FIG. 9 is a flowchart of the data deletion processing that is executed in step 707 in case a commando received from the external device in step 706 of FIG. 7 is a data deletion requirement. A list of an image data accumulated to the storing device 213 in step 901 is made a command, and it is transmitted to the external device. In 902, it waits for receiving of the data specification command that is deleted the image data. In case the deletion of all data specified in step 903 and specified in the commando after specification commando receiving ended, judged and did not end in step 902, the data that is deleted next in step 904 is deleted from the storing device. After the data was deleted, it is judged all data that specified in the command are deleted in step 903. In case the deletion of all data ends in 903, processing is ended.

Figure 10:
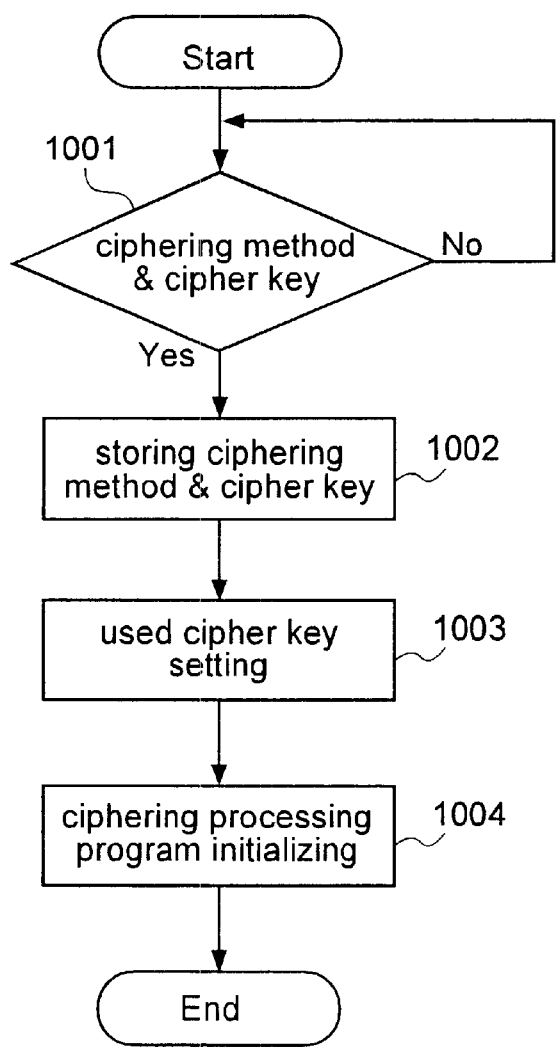
FIG. 10 is the flowchart of cipher system alteration processing in FIG. 7.

FIG. 10 is a flowchart of the cipher system alteration processing that is executed in step 709 in case a commando received from the external device in 708 of FIG. 7 is a cipher system alteration command. It is judged whether the cipher system and the commando of cipher key specification are received from the external device in step 1001. The cipher system specified in the commando received in 1002 and a cipher key are accumulated to the storing device. It is set as the relevant cipher system, the cipher system using a cipher key when doing the following enciphering processing in step 1003 and a cipher key. A enciphering processing program is initialized in step 1004. Rearranging a data in step 1002, a enciphering and an accumulation can be done for a cipher key.

Figure 11:
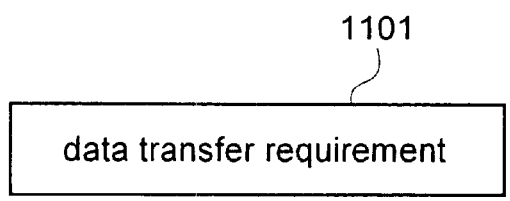
FIG. 11 is the example of a data transfer processing command.

The example of the data transfer requirement commando that is received from the external device in FIG. 11 is shown. 1101 is the identifier that shows that it is a data transfer requirement.

Figure 12:
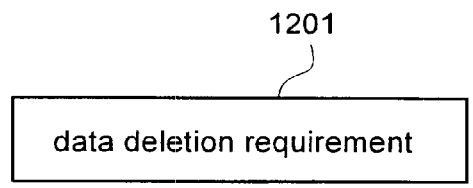
FIG. 12 is the example of a data deletion requirement command.

The example of the data deletion requirement command that is received from the external device is shown in FIG. 12. 1201 is the identifier that shows that it is a data deletion requirement.

Figure 13:
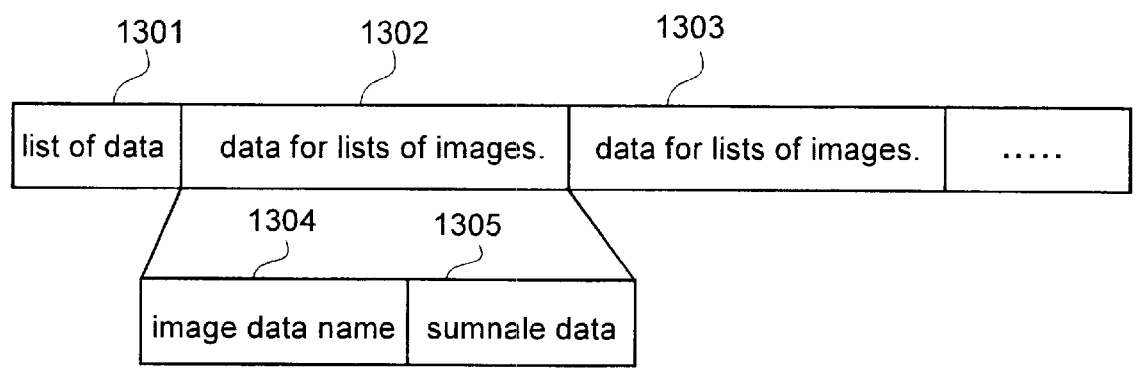
FIG. 13 is a diagram showing an example of a data list command.

The example of the data list commando that is transmitted to an external device is shown in FIG. 13. 1301 is the identifier that shows that it is a list of data. And, 1302 and 1303 are data for lists of images. The data for a list of images is "a sumnale data" of a place where an image reduced and created from the image data name of 1304 and the image data of 1305 is a sample data. There may be "The sumnale data".

Figure 14:
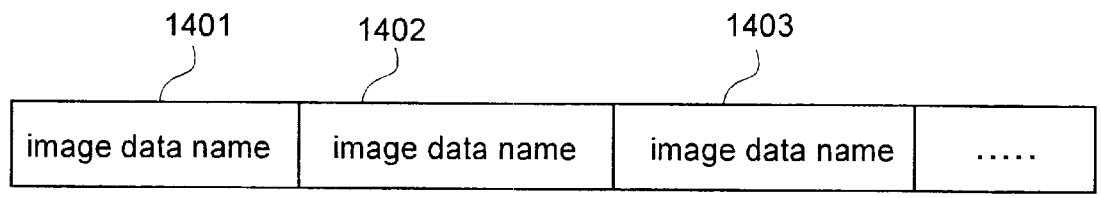
FIG. 14 is a diagram showing an example of a specification command.

The example of the specification commando that is received from the external device is shown in FIG. 14. 1401, 1402 and 1402 are specified image data names.

Figure 15:
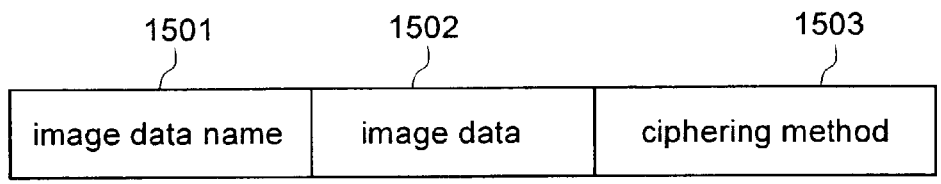
FIG. 15 is a diagram showing an example of an image data command.

In FIG. 15, the example of the image data commando that is transmitted to an external device is shown. 1501 is an image data name, 1502 is an image data, 1503 is an enciphering method of the image data was enciphered. In case a enciphering is not done and in case a cipher system is fixed as a system, cipher system 1503 cannot be.

Figure 16:
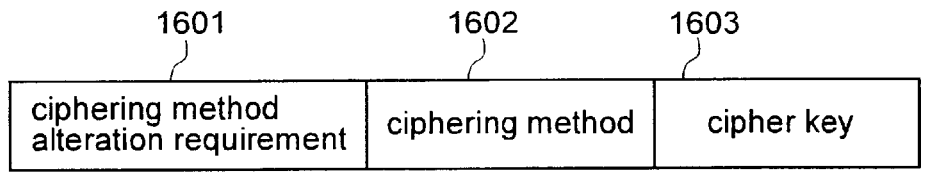
FIG. 16 is a diagram showing an example of a cipher system alteration requirement command.

The example of the cipher system alteration requirement commando that is received from the external device is shown in FIG. 16. 1601 is the cipher key that is used in the relevant cipher system, 1602 is 1503 is an enciphering method, and 1603 is enciphering key that used by the enciphering method. If a cipher key is not used in the enciphering method, there may not be the cipher key.

Figure 17:
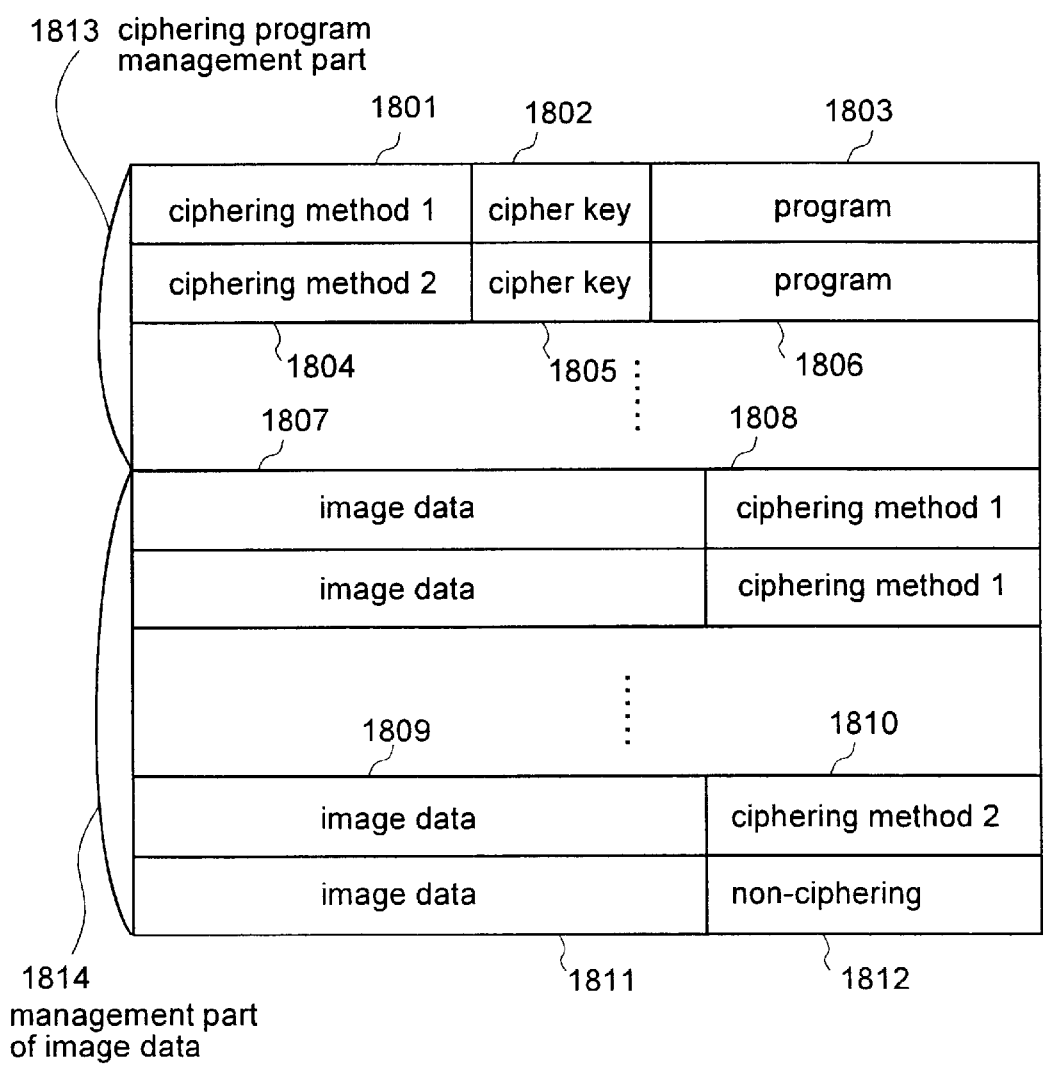
FIG. 17 is a diagram showing an example of a data control table.

The example of the control table of the data that is accumulated to the stock pile device is shown in FIG. 17.

1813 is control part of the enciphering program, and stores the enciphering method, the cipher key and the enciphering program. The enciphering method, the cipher key and the enciphering program store related each other in the control part. In the embodiment, enciphering program 1803 executes enciphering method 1 of 1801 by using the cipher key 1802, and a enciphering program 1806 shows that cipher system 2 of 1804 is executed by using the cipher key 1805. 1814 is control part of the image data, and stores the enciphering method and the image data. The enciphering method and the image data control with relation of each other in the control part.

The enciphering method 1 of 1808 in this embodiment, the enciphering of image data 1809 in enciphering method 2 of 1810 and the indication of the enciphering in 1812 by image data 1811 are done for image data 1807. A address that instead of managing a enciphering program in 1803 and 1806, a enciphering program is accumulated separately can be managed the storing device, and a enciphering program name can be managed. And various enciphering processing can be omitted in 1 enciphering program. In case a cipher system does not use the cipher key, a cipher key can be omitted, and in case the enciphering method that is used in the image pickup apparatus is fixed, there cannot be enciphering program management part 1813. In this case, it may store and control relating the image data and enciphering or non-ciphering, without to store and control relation of the image data and enciphering method. At that time, as it is shown that a enciphering is being done, in this embodiment, 1808 and 1810 changes.

Accumulation equipment removes it from the image pickup equipment and manages only management part 1814 of image data an accumulation to the accumulation equipment in case it is done. And then, a cryptograph key can be enciphered, it can accumulate, by the accumulation management to the storage that can be removed and cannot be done from the image pickup equipment of management part 1813 of an enciphered program, data can be rearranged.

Figure 18:
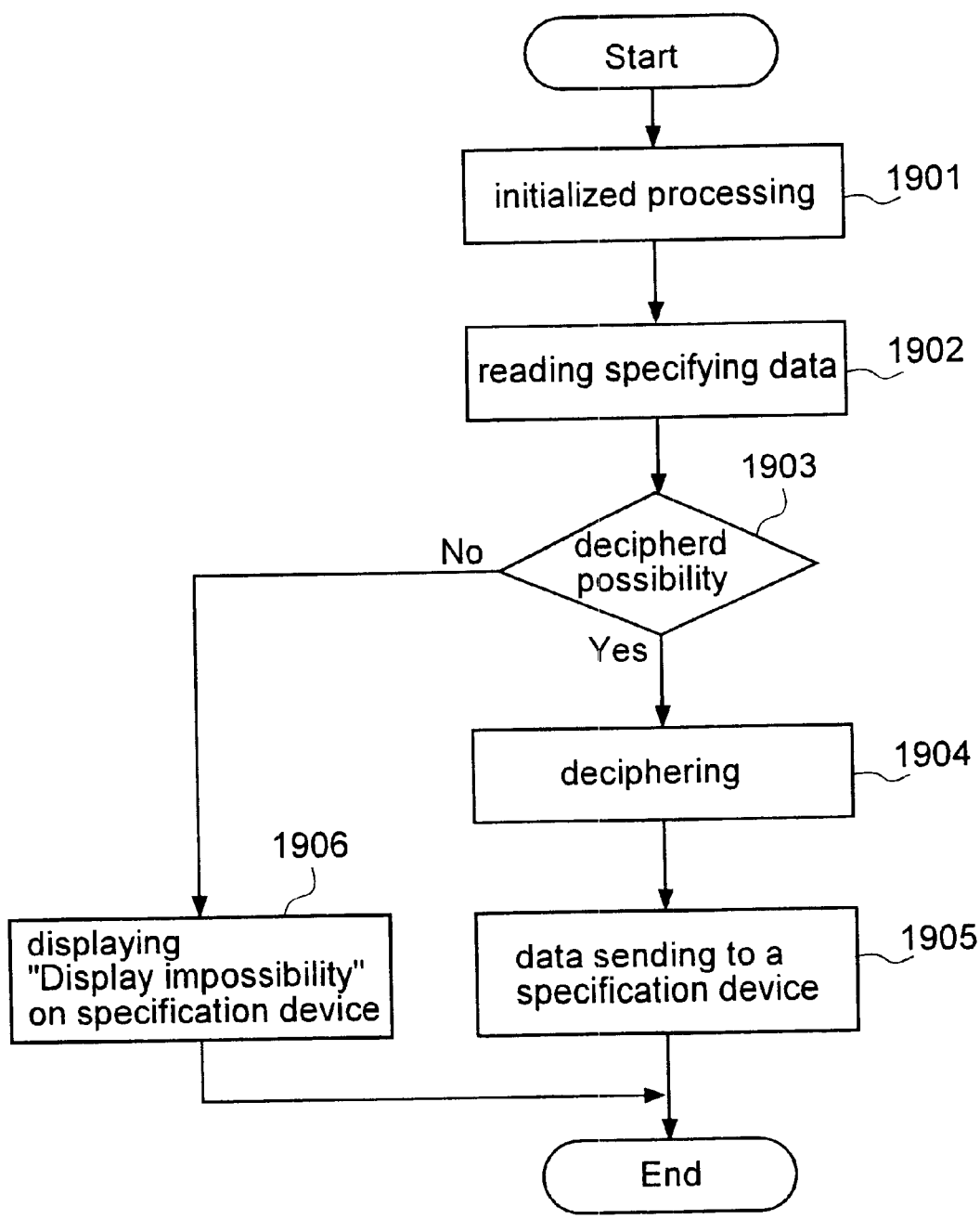
FIG. 18 is a diagram showing a flow-sheet of a deciphering program in FIG. 3.

FIG. 18 is 1 flow-sheet of a cipher deciphering program that is instructed a state that is deciphered and the cipher of an image data specified in 503 of FIG. 5 displays on a display unit) and is instructed so that it is deciphered, and the cipher of an image data specified in 603 of FIG. 6 likewise outputs it to a television output unit. An image data specified from the control table in the stock pile device that showed an example in FIG. 17 in 1902 that did initialized processing in 1901 and a enciphering system are read.

It is judged whether it is a method that cannot be deciphered when a cryptograph method is enciphered once in 1903 like for example, provisional publication key cryptograph method in 1903. In case of the method that cannot be deciphered, image deciphering equipment is directed to output it to a equipment (in this embodiment, the equipment is the display device or the television output device) specified to display it on 1906 to "display impossibility".

In step 1903, the image data was enciphered by a enciphering method to be done deciphering like as JPA-10-108180, in step 1904 deciphering the encored image data, the image deciphering device is instructed to output the image data to an equipment (in this embodiment, the equipment is the display device or television output device). The enciphering method as shown in JPA-10-108180, whose disclosure is incorporated by herein by reference.

Figure 19:
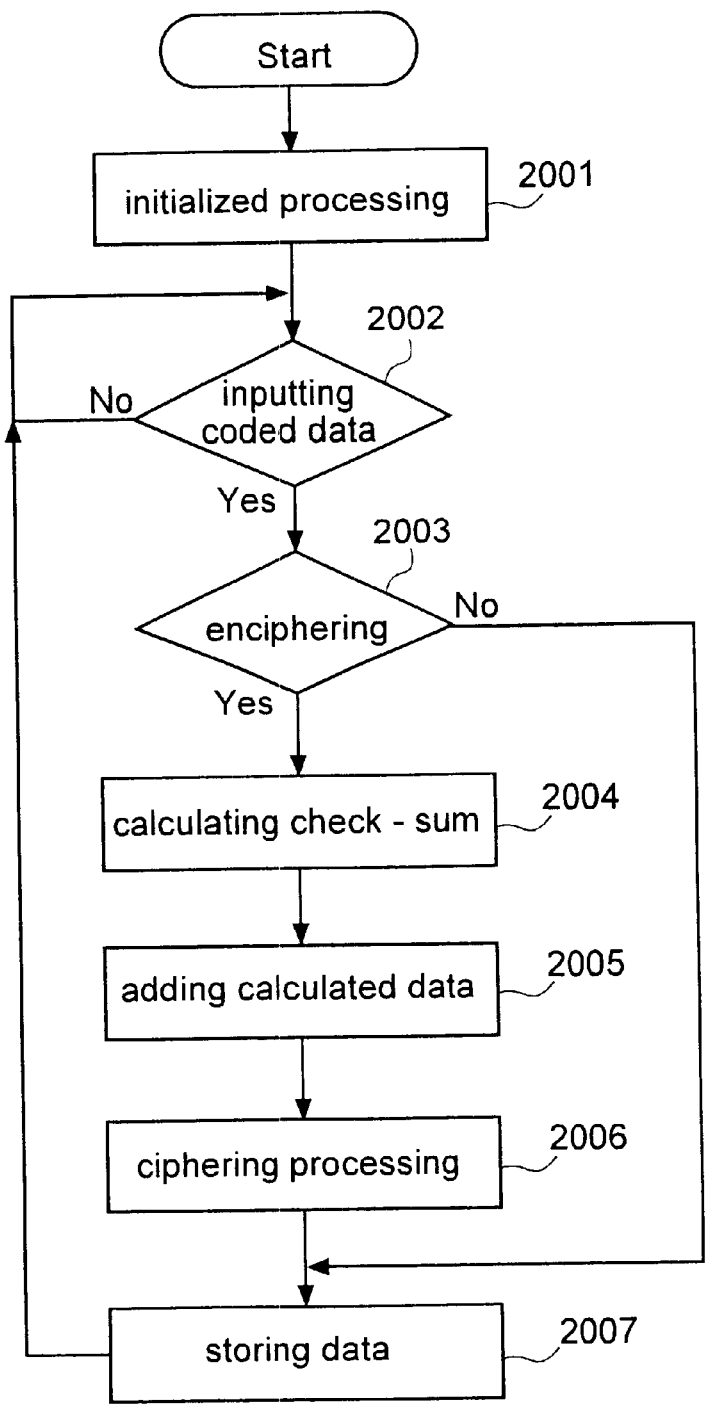
FIG. 19 is a diagram showing an example of a enciphering program in FIG. 3.

A flowchart of processing of a enciphering program on the image pickup apparatus is shown in FIG. 19. The system that is done by the following the enciphering method and the cipher key are done a initialization to the origin in 2001. It waits for output of an image data that the cipher from the image cipher device in 2002 happened. In 2003, it is judged whether the image data is enciphered or not, when the image data is not enciphered, the image data is stored in storing device 2007 and controlled by storing device 2007. The result of 2005 is added after the cord that represents the termination of an image in the image data that calculates the check SAM of an image data before doing the enciphering in 2004 in case the enciphering in 2003 is done, and the enciphering in 2006 is done for an image data after a calculation data addition. A result that a check-sum is calculated can be added to the area that can be used for a freedom in the application in the image data in 2005. And, in case it is not necessary to find that the user of the client terminal that is referred to which an image data is transmitted changed an image or in case it is not necessary to control presence or absence of the alteration of an image so severely, 2004–2005 can be omitted.

The enciphering method that is done in 2006 uses a method to be done to display the image piled the enciphering key is used in 2006, like as JPA-10-108180. And, the cipher system that cannot be handled as an image in 2006 like a publication key cipher system can be used.

Figure 20:
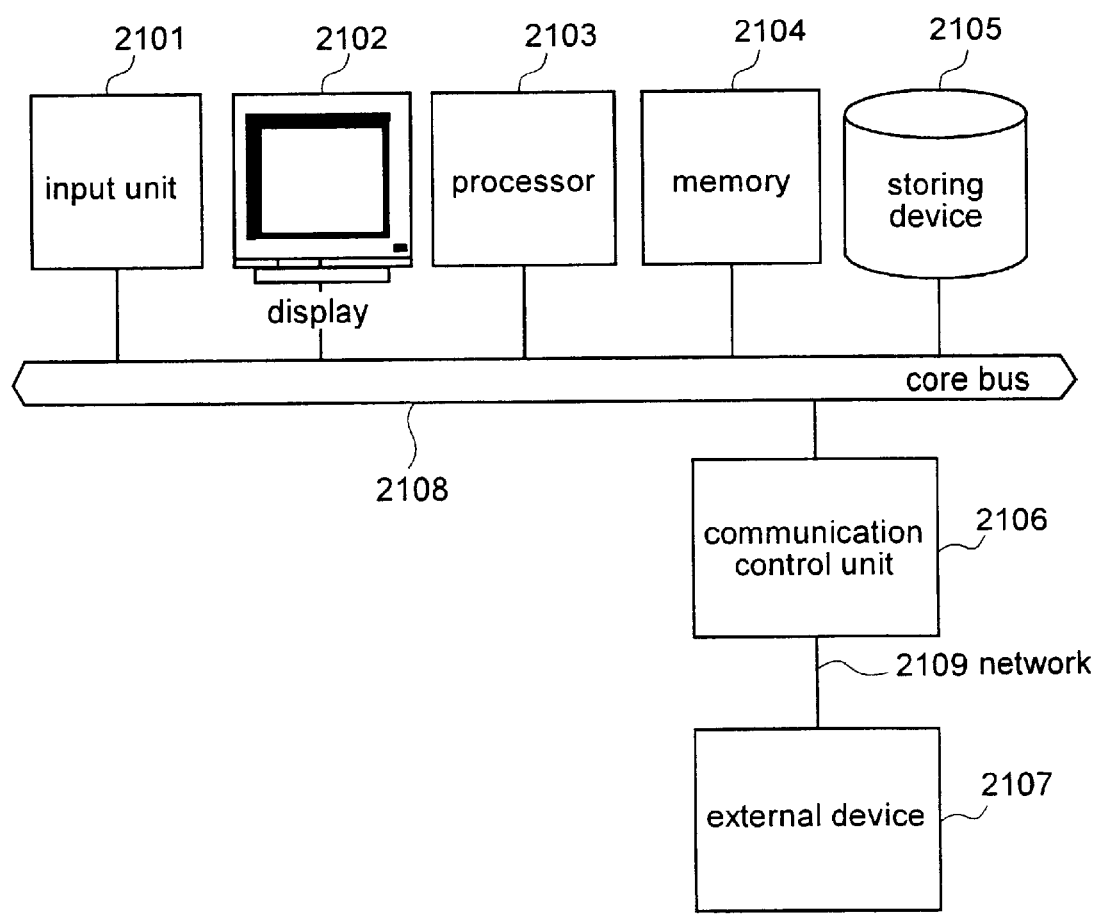
FIG. 20 is a block diagram of a client terminal.

The client terminal that connected to the image pickup apparatus, received the image data, and displaying the received image data is shown in FIG. 20. The command received through the communication control unit 2106 from the external device 2107 such as the image pickup apparatus that is connected via the network 2109 is read to the memory 2104, it is processed, therefore, it is transmitted to the external device 2107 via the network 2109, and the created the command is input into the communication control unit 2106. The image data accumulated to the storing device 2105 is displayed on the display 2102 by the program that operates in processor 2103 according to the user instructions input from the input unit 2101. The input unit 2101, the display 2102, the processor 2103, the memory 2104, the storing device 2105 and the communication control unit 2106 are connected via the core bus 2108. It is not necessary to connect the communication control unit 2106 to the network 2109 in case the client terminal does not operate the external device 2107 such as the image pickup apparatus.

Figure 21:
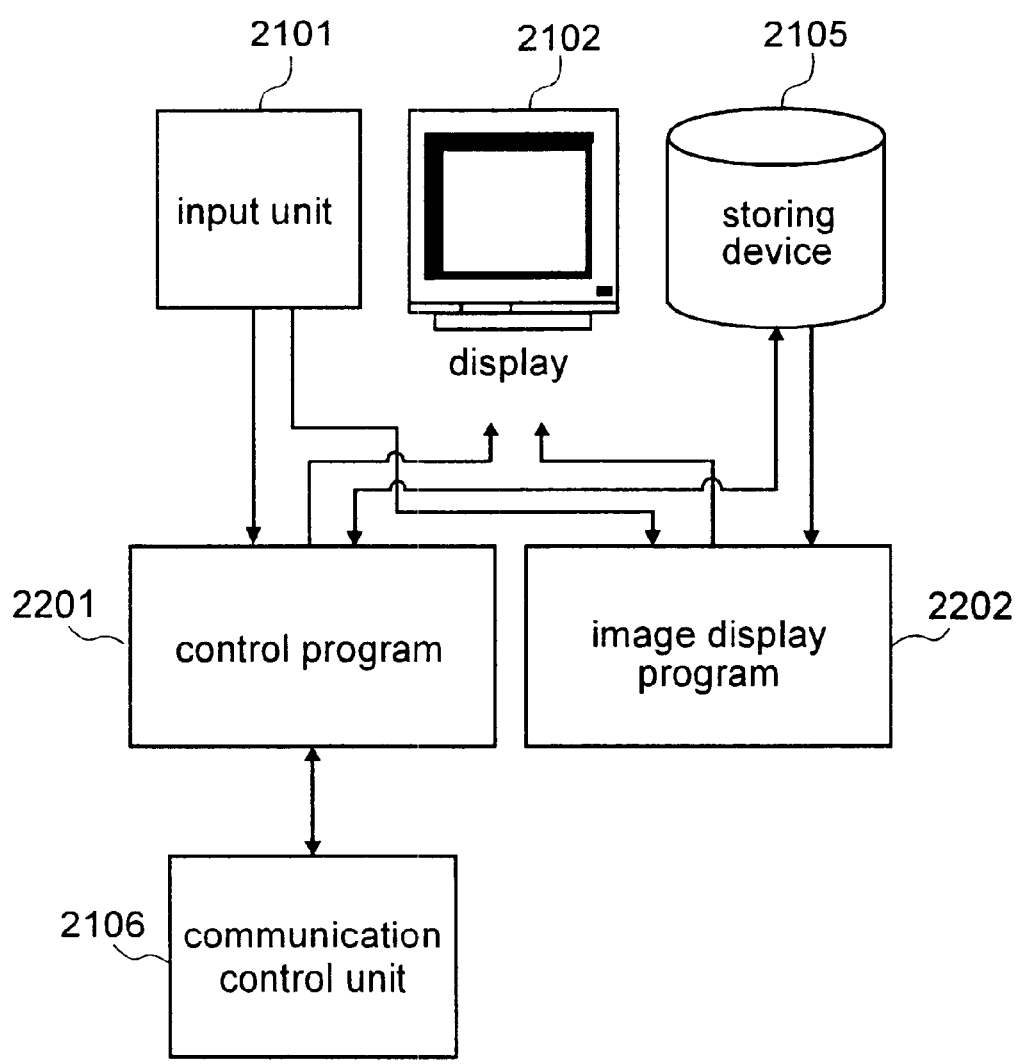
FIG. 21 is a block diagram of a control program in the client terminal and an image display program.

The constitution of the control program that operates in the processor 2103 of the client terminal in FIG. 21 and the image display program is shown. As a result the various setting of the image pickup apparatus are changed, the image data in the storing device of the image pickup apparatus is deleted, it is taken in the communication control unit 2106 and a commando are transmitted and received, and 2201 follows instructions of the user input from the input unit 2101 in the control program. The image display program manages a cipher system and a cipher key to stock pile device 2105 and deciphers an image data and displays it on display 2102 according to the user instructions that are input from the input unit 2101.

Figure 22:
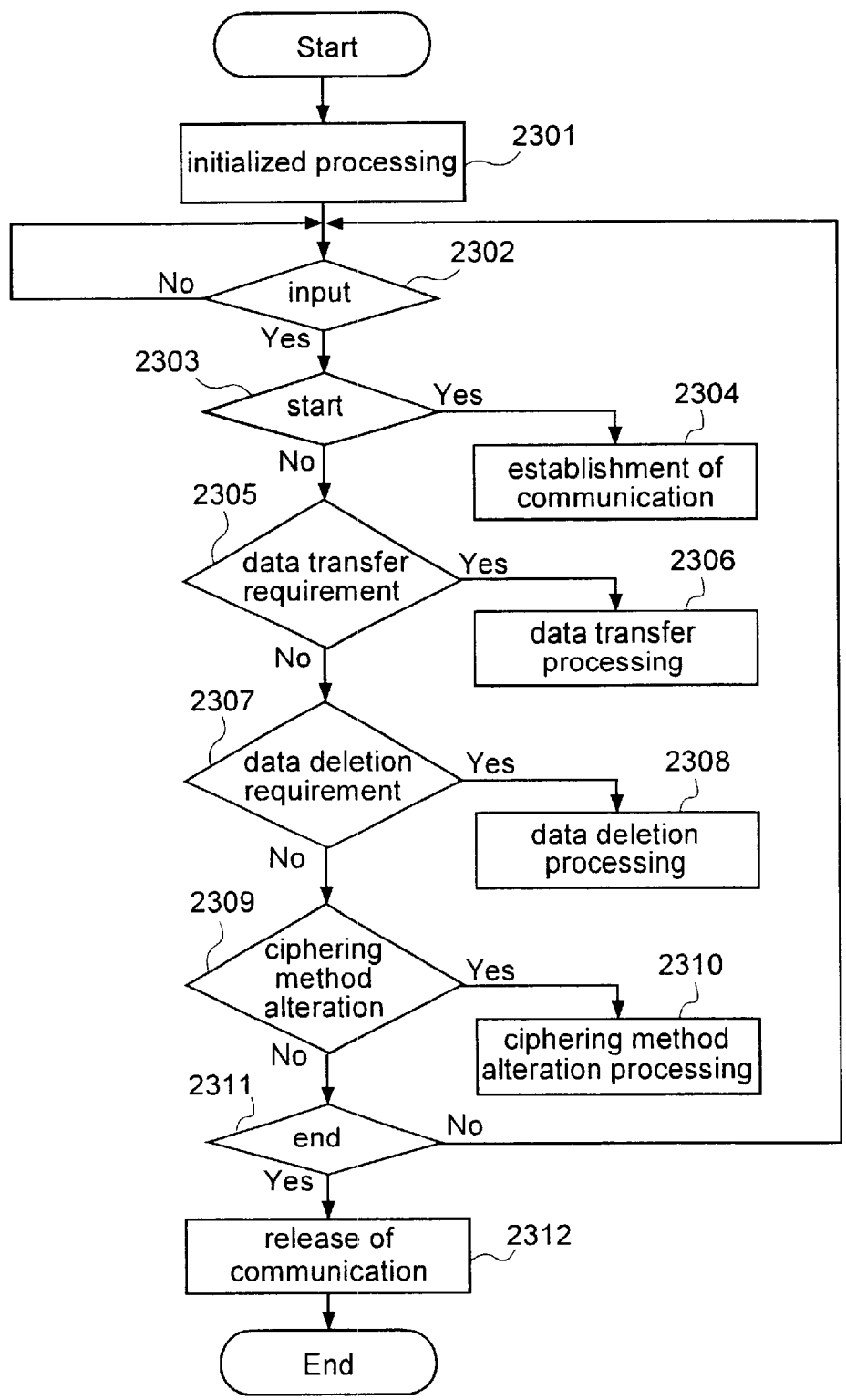
FIG. 22 is a flowchart of processing of a control program in FIG. 21.

A flowchart of processing of a control program on the client terminal is shown in FIG. 22. In 2302, initialized processing is done. In 2302, input of instructions by a user from the input unit is done. When the user inputs instructions in 2302, the inputted instruction is decided that is processing starts with the image pickup apparatus or not. If the instruction is decided that is the processing starts, a communication connection is established with the image pickup apparatus in 2304. If the instruction is decided that is not the processing starts, the instruction inputted in 3205 is decided that is data transfer requirement or not. If the instruction inputted in 3205 is decided that is data transfer requirement, the data transfer processing is done in 2306. If the instruction inputted in 3205 is decided that is not data transfer requirement, the instruction inputted in 3205 is decided that is data deletion requirement or not in 2307. If the instruction inputted in 3205 is the data deletion requirement, the data deletion requirement is done in 2308 If the instruction inputted in 3205 is not the data deletion requirement, the instruction inputted in 3205 is decided that is requirement of enciphering method alteration or not. If the instruction inputted in 3205 is the requirement of enciphering method alteration, the requirement of enciphering method alteration is done in 2310. If the instruction inputted in 3205 is not the requirement of enciphering method alteration, the instruction inputted in 3205 is decided that is end of processing or not in 2311. If the instruction inputted in 3205 is the end of processing, the processing is ended by releasing the communication connection with the image pickup apparatus in 2312. If the instruction inputted in 3205 is not the end of processing, and after the establishment of communication 2304, the data transfer processing 2306, the data deletion processing 2308, or the enciphering method alteration processing 2310, the instruction from the user is waited in 2302 again. In case a cipher system is made a fixation, 2309–2310 is omitted.

Figure 23:
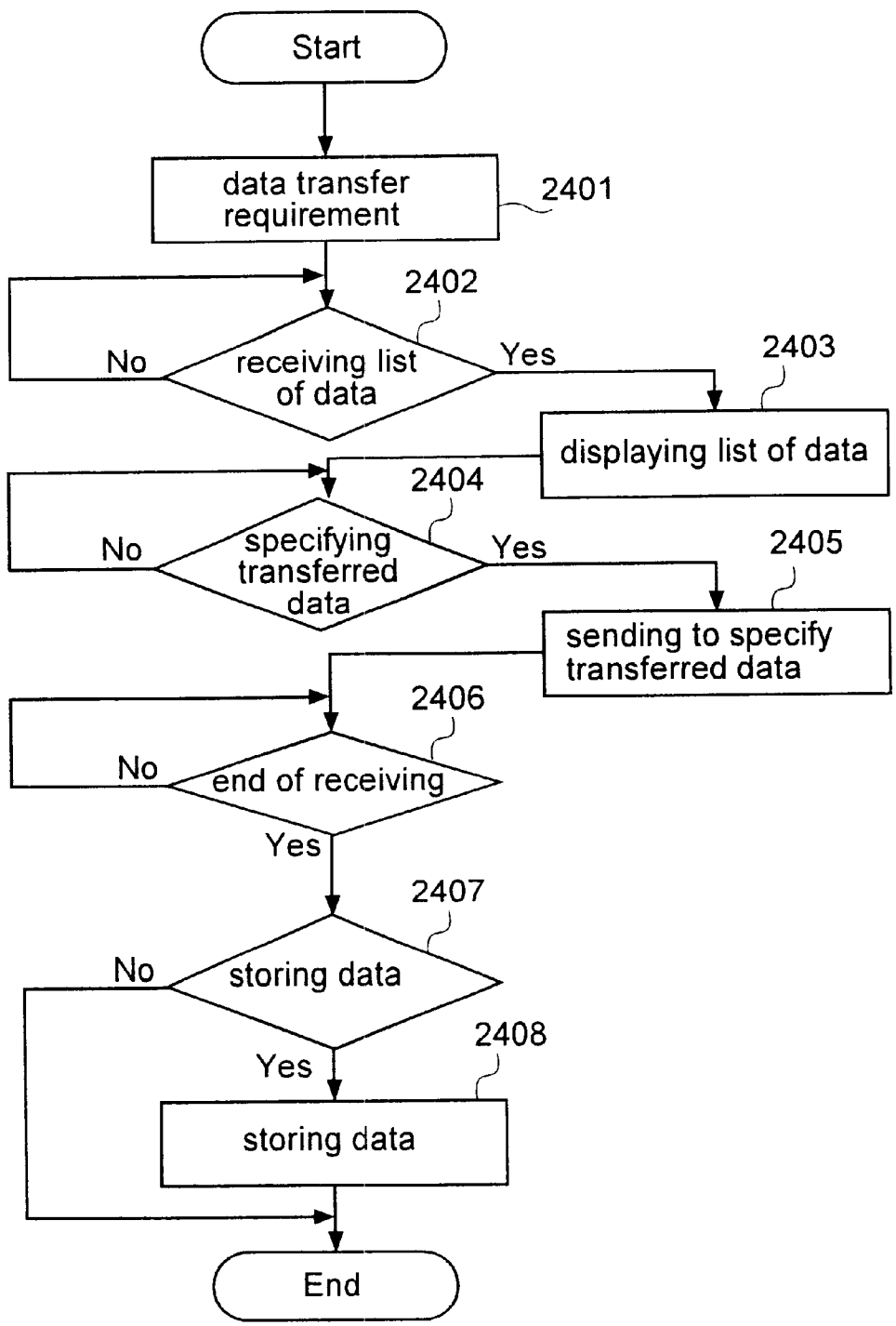
FIG. 23 is a flowchart of data transfer processing in FIG. 22.

FIG. 23 is a flowchart of the data transfer processing that is executed in 2306 in case the instructions that a user input in 2305 in FIG. 23 are data transfer requirements. It waits for the transmission to the image pickup apparatus of a data transfer requirement commando in 2401 and the receiving of a data list commando in 2402. It waits for the input from the input unit of specification of the data that is transmitted from a list where a user was displayed on 2404. The specification commando of a data specified in 2404 is transmitted to an image pickup apparatus in 2405. It waits for transmission of a data specified from the image pickup apparatus in 2406 and receiving of all data. It waits for the indication of the instructions that preserve the relevant data in the storing device in 2407 after receiving of all data by a user in 2406.

In case a user indicates preservation of a data in 2407, after stock pile retention, processing is ended to the stock pile device in 2408. In case it is indicated that it is not retained a data in 2407, processing is ended.

Figure 24:
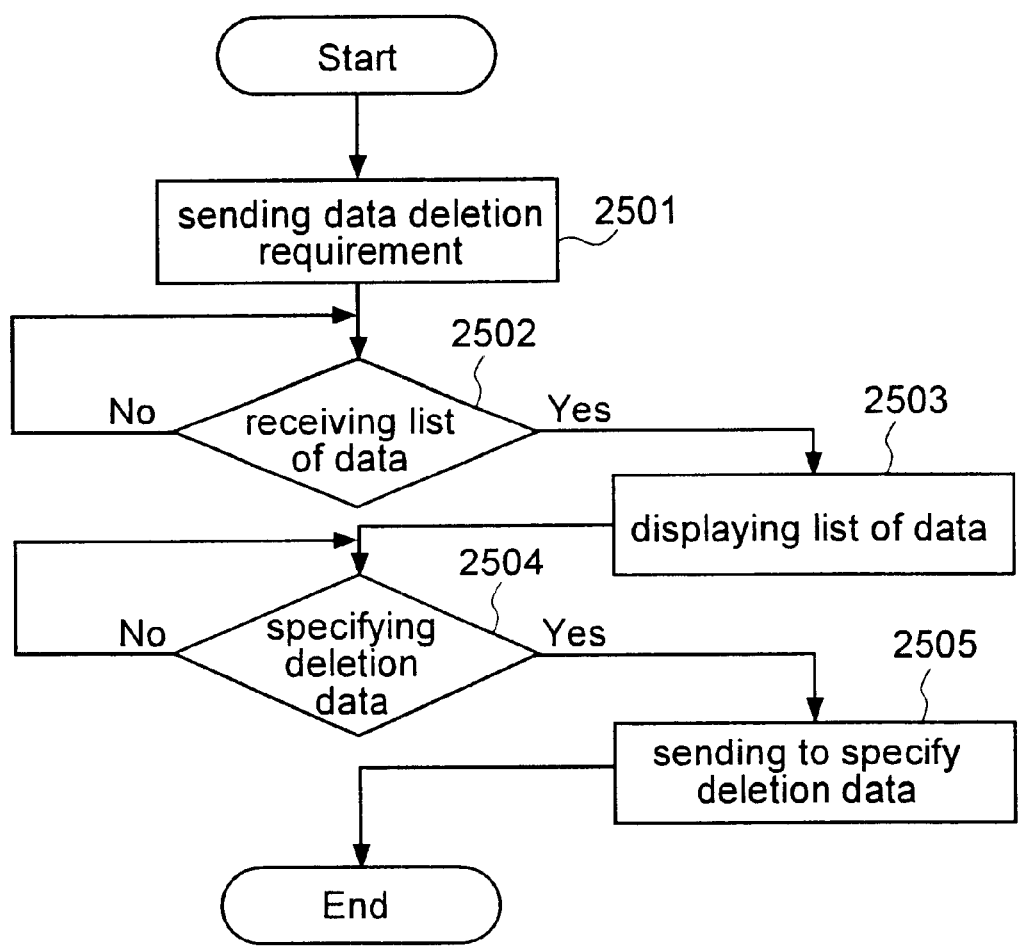
FIG. 24 is a flowchart of data deletion processing in FIG. 22.

FIG. 24 is 1 flow-sheet of the data deletion processing that is executed in 2308 in case the instructions that a user input in 2307 in FIG. 23 are data deletion requirements. It waits for the transmission to the image pickup apparatus of a data deletion requirement in 2501 and the receiving of a data list command in 2502. A list of data received in 2502 is displayed on the display in 2503. It waits for the input from the input unit of specification of the data that is deleted from the list where a user was displayed on 2504. The specification command of a data specified in 2504 is transmitted to the image pickup apparatus in 2505, and processing is ended.

Figure 25:
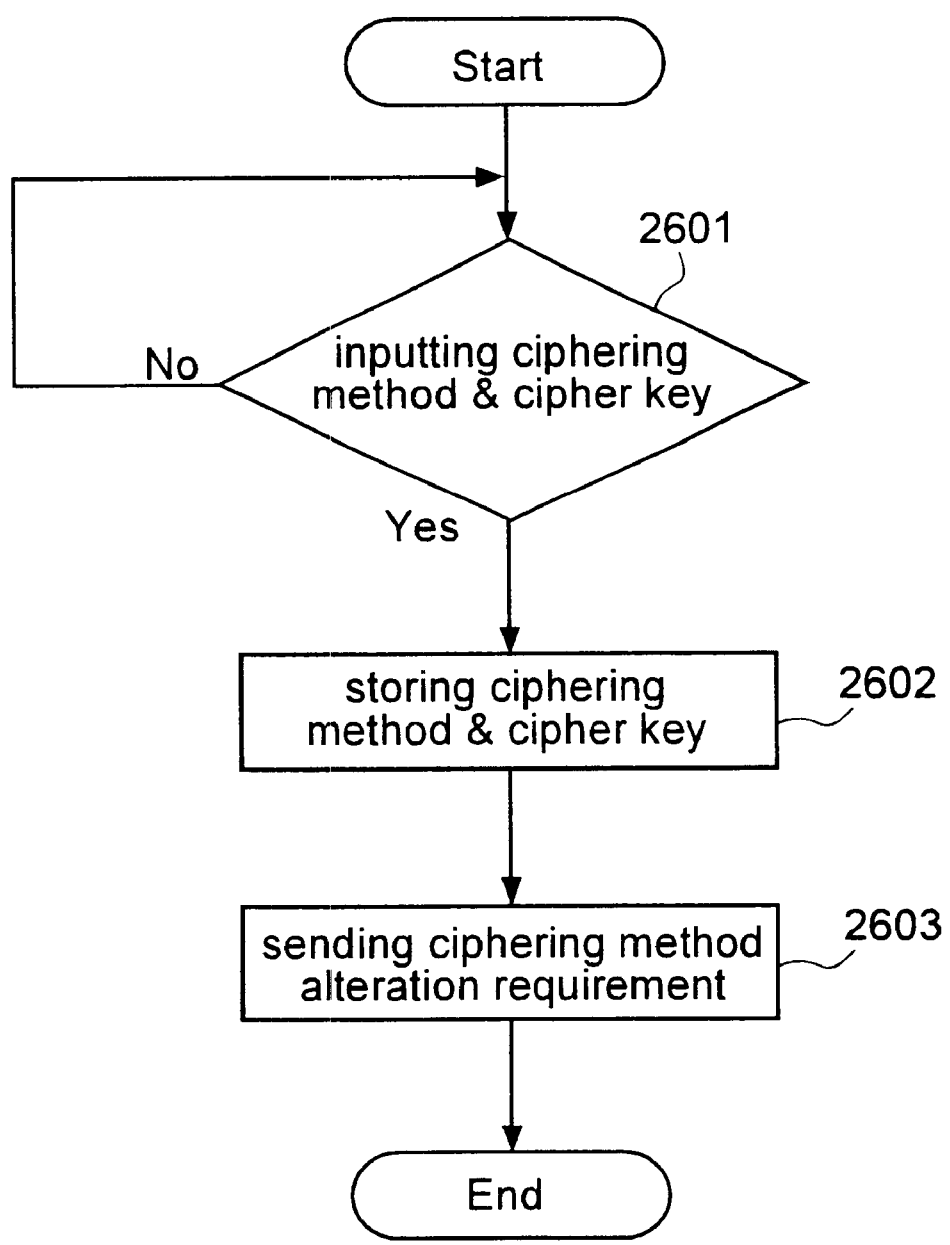
FIG. 25 is a flowsheet of a cipher system alteration reason in FIG. 22.

FIG. 25 is a flowchart of the cipher system alteration processing that is executed in 2310 in case the instructions that a user input in 2309 in FIG. 22 are cipher system alteration requirements. It waits for input of the cipher key that a user uses for the enciphering method and it in 2601. When the enciphering method that a user input in 2601 and a cipher key are managed the storing data to the storing device, the requirement of enciphering method alteration command is transmitted to an image pickup apparatus in 2603, and processing is ended.

Figure 26:
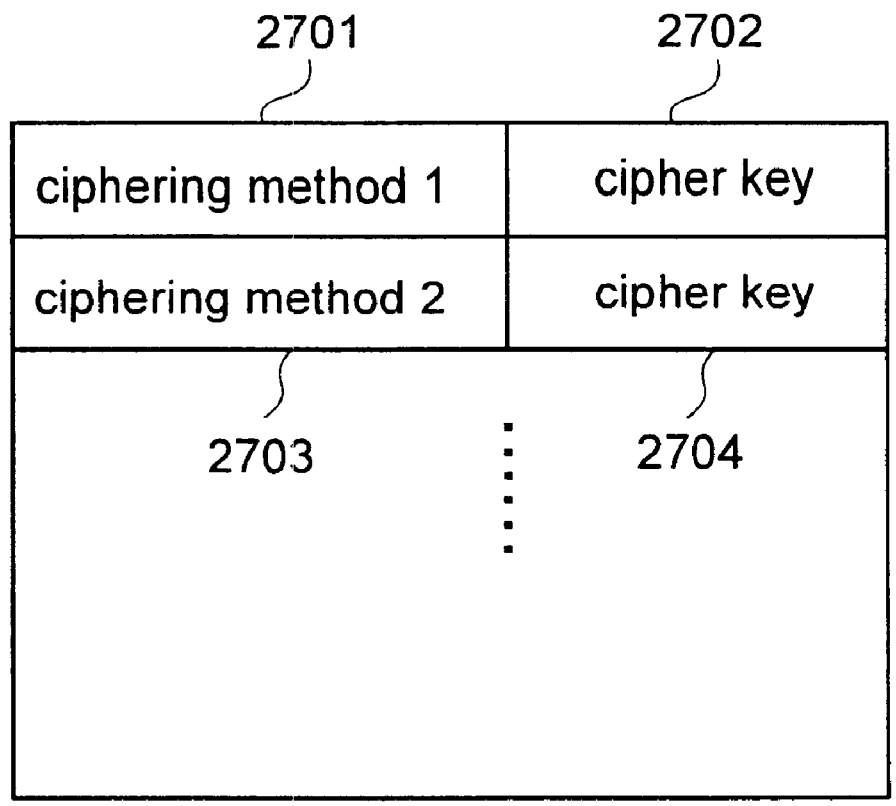
FIG. 26 is a diagram showing an example of a cipher system control table in FIG. 22.

The example of the enciphering method control table that is accumulated to the stock pile device is shown in FIG. 26. In this example, it is shown that the cipher key 2702 is used in cipher system 1 of 2701, and the cipher key 2504 is used in enciphering method 2 of 2703. Rearranging a data, a enciphering and an accumulation can be done for a cipher key. And, in case a cipher system is a fixation, this table can be omitted, and a display program can have a cipher system and a cipher key.

Figure 27:
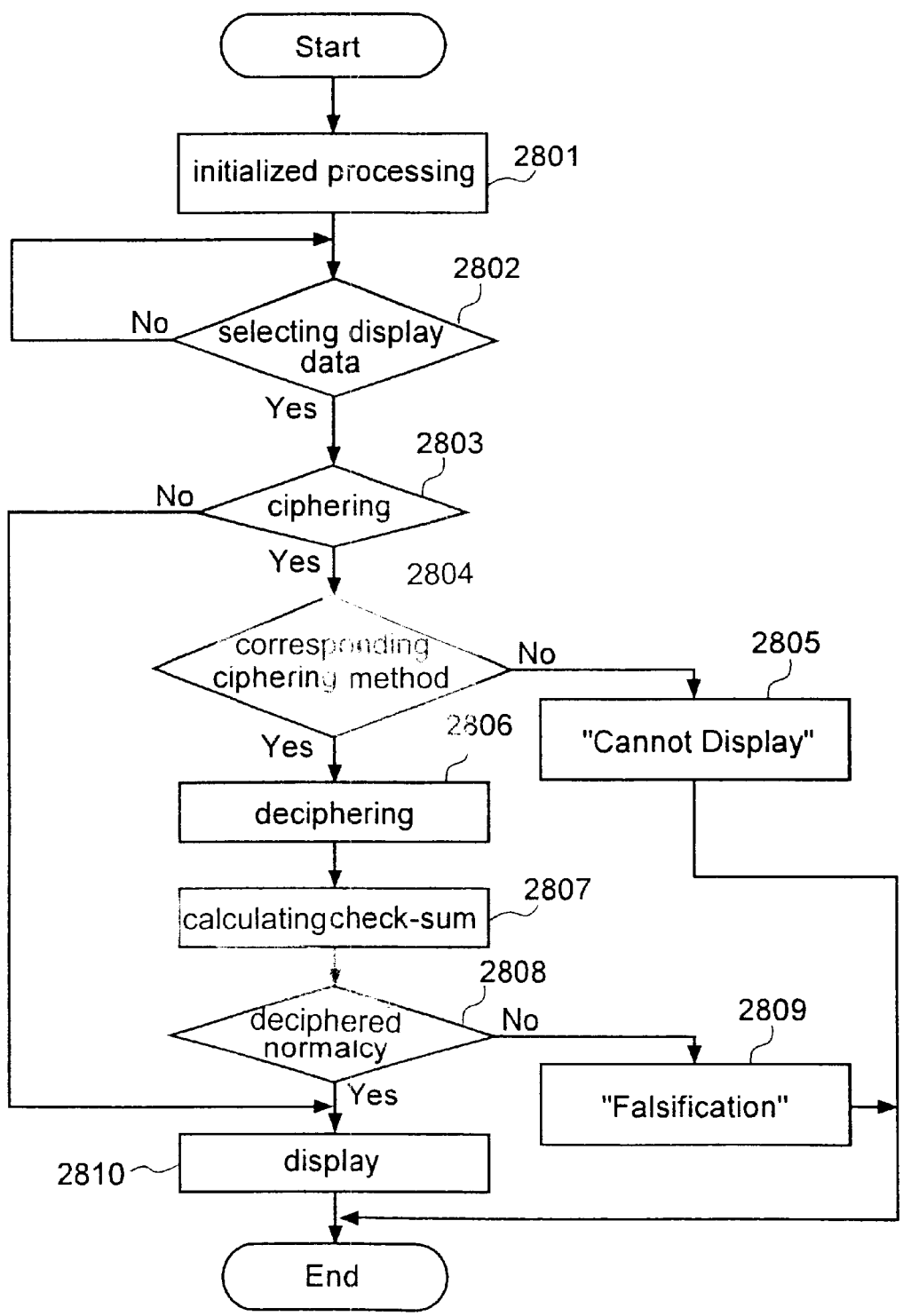
FIG. 27 is a flowchart of processing of an image display program in FIG. 21.

A flowchart of processing of an image display program on the client end is shown in FIG. 27. It waits for a selection of the data that is displayed on 2802 from the input unit that does initialized processing in 2801. In case the enciphering, the judgment in 2803 and the enciphering are done for the data that a user selected in 2802, an image is displayed on a display in 2810. When it is enciphered the image data in 2803, it is judged whether the enciphering method is corresponding with 2804, and the enciphering method is not corresponding with 2804, displaying "Cannot Display".

When he enciphering method is corresponding with 2804, deciphering the image data in 2806, calculating a check-sum of an image data omitted a check-sum in FIG. 2807, comprising calculated check-sum and added check-sum to the image data in 2808. And when result of the comparison the calculated check-sum and added check-sum is not an equivalence same, displaying "Falsification" on the display. In case it is not necessary to find that the user of the client terminal that is referred to which an image data is transmitted changed an image or in case it is not necessary to control presence or absence of the alteration of an image so severely, 2807–2809 can be omitted.

Figure 28:
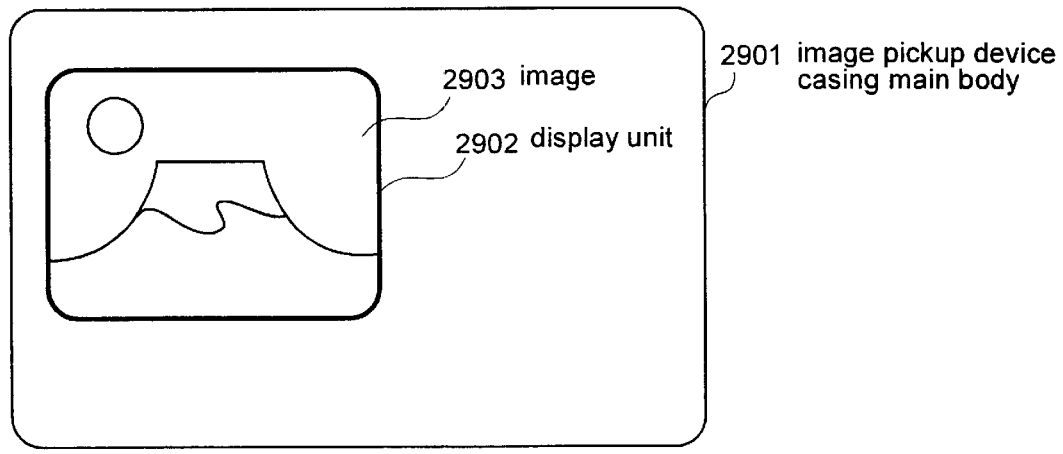
FIG. 28 is a diagram showing an image plane example that is shown to the display unit of the image pickup apparatus.

The image plane example that is shown to the display unit of an image pickup apparatus in case the enciphering in the image deciphering data organization method of JPA-10-108180 and an image cipher data deciphering system is being done is shown in FIG. 28. As for the display unit and 2903, 2901 is an image pickup apparatus casing main body, and 2902 is the image that is displayed.

Figure 29:
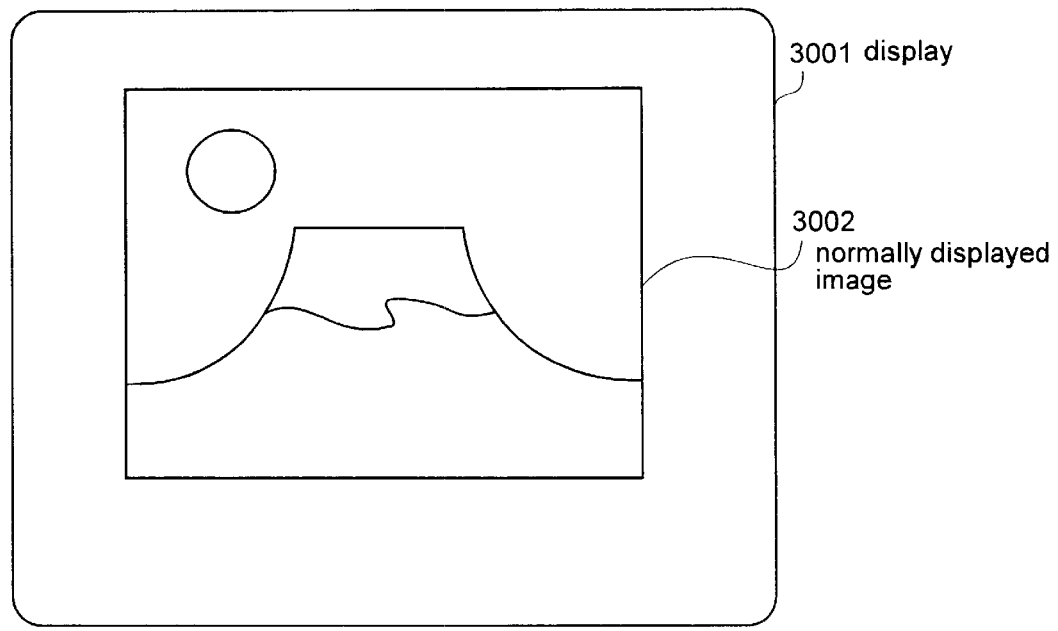
FIG. 29 is a diagram showing an image plane example that is shown on the client terminal that can decipher the image of FIG. 28.

FIG. 29 is the image plane example that is shown on the client terminal that can decipher the image data that showed an example in FIG. 28 3001 is a display, and 3002 is a normally displayed image.

Figure 30:
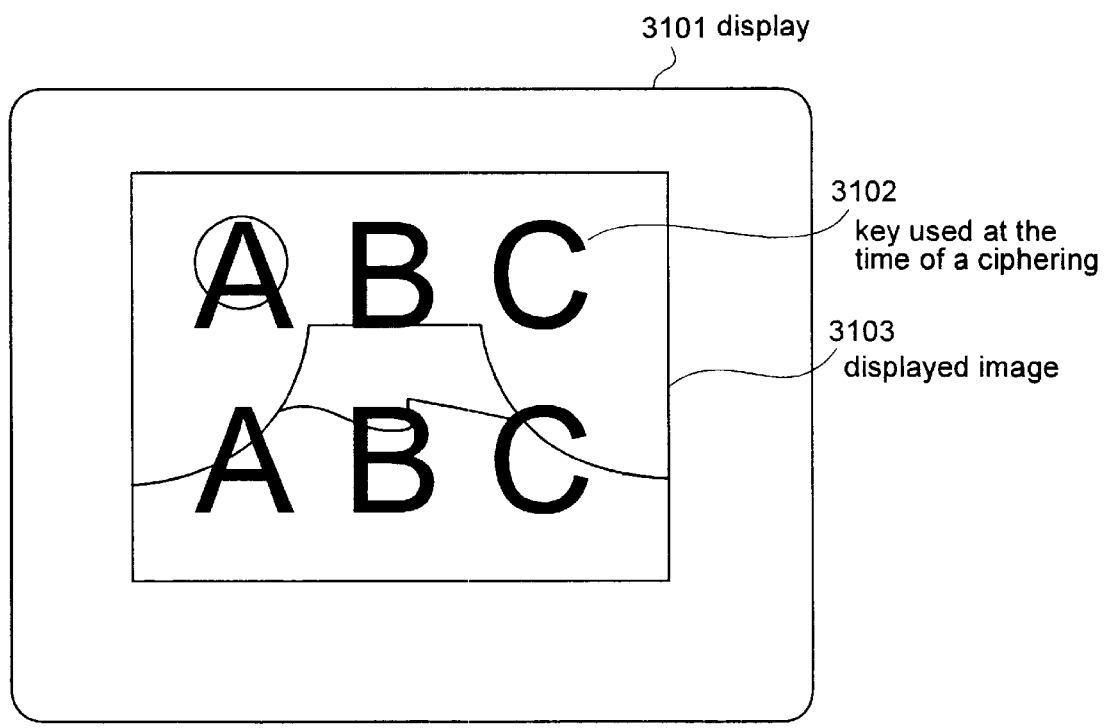
FIG. 30 is a diagram showing an example of the image plane that is displayed on the client terminal that cannot decipher the image of FIG. 28.

FIG. 30 is the image plane example that is shown on the client terminal that cannot decipher the image data that showed an example in FIG. 28. As for the displayed image and 3102, 3103 is a key used at the time of a enciphering, and 3101 is the cipher key in the display.

Figure 31:
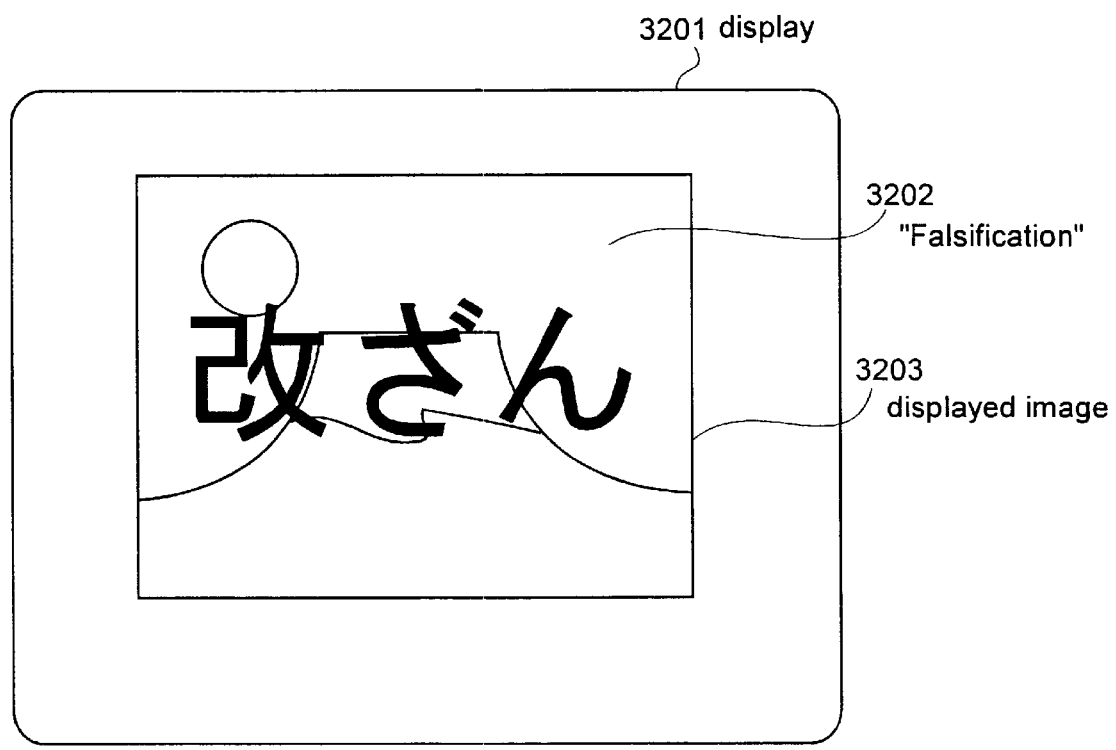
FIG. 31 is a diagram showing an example of the image plane that is displayed in case the image of FIG. 28 is falsified.

FIG. 31 is the image plane example that is shown by a check SAM calculation at the time of cipher deciphering in the client terminal that can decipher the image data that showed an example in FIG. 28. As for the displayed image and 3202, 3203 is shown, and "Falsification" is shown by 3201 in the display.

And, in case it is being enciphered in JPA-10-108180, it becomes an image on which even if a display is done on the client terminal that can decipher image data *(a cryptograph), in case even if check-sum calculation is not done, a falsification is done to the image data, a cryptograph key was displayed like FIG. 30, and a falsification is disclosed easily.

It is transmitted from image data in the state of enciphering before accumulating the image data that was picked up that provided an enciphered function in the image pickup equipment according to the above example to the accumulation equipment and enciphering in case of transmitting image data to external equipment. Therefore, Only receiver of the image data can decipher the image data. Therefore, an image data receiving person can certify a change addition of image data by a photographing person. And, according to this example, check-sum calculation result of image data is enciphered, after an addition, image data is enciphered, and after cryptograph deciphering, a check-sum of image data is calculated on the receiving person side. It is done to certificate the image data receiver not to add change to the image data against the photographing person the other person, by comparing calculated check-sum and the extracted check-sum.

Figure 32:
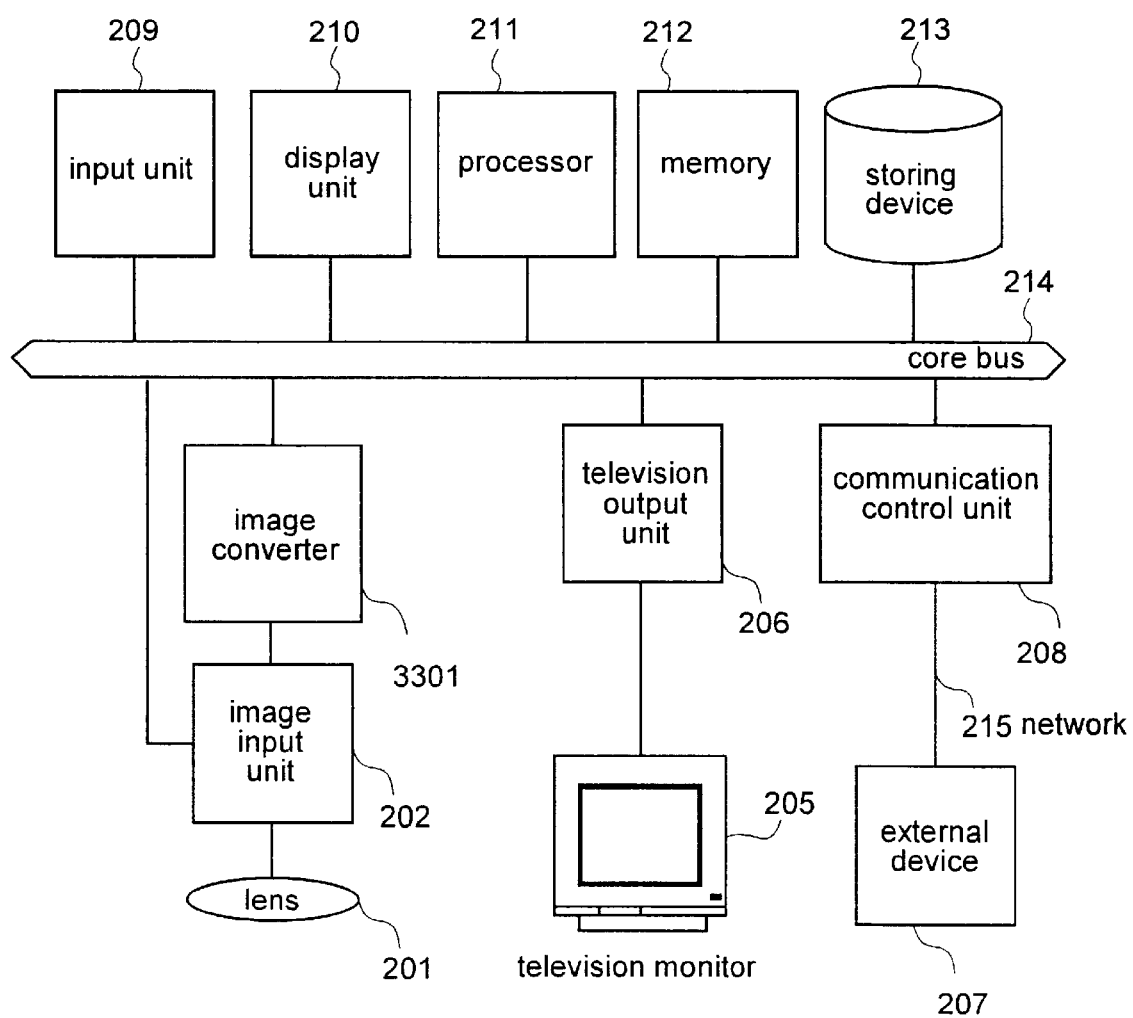
FIG. 32 is the block diagram of another image pickup apparatus to implement the present invention.

And, the enciphered method that is displayed on a state that was enciphered while it can be displayed as an image, in case according to this example, the receiving person side adds a change to image data is used. So it is done to certificate the image data receiver not to add change to the image to the photographing person and the other persons, with out calculating the check-sum. The constitution of another image pickup apparatus to implement a present invention in FIG. 32 is shown. 201–202 and 205–214 is the same as FIG. 2. The image input into the image input unit via lens 201 is input into an image converter 3301 according to instructions of the user input from the input unit 209. The enciphering the back of a cipher the obedience to the setting accumulated to stock pile device 213 of the input image, the cipher and the accumulation to the stock pile device and the accumulation in the storing device are done. The image data accumulated to the accumulation equipment follows indication of a user input from input device 209 and deciphers it after cryptograph deciphering in case it is input and is cipherd into image conversion equipment with the program that operates on processor 211. And then, in case it is not enciphered, it is deciphered, and it is displayed to display 210, and it is displayed to television monitor 205 through television output device 206.

The lens 201, the image input unit 202, the television output unit 206, the communication control unit 208, the input unit 209, display unit 210, the processor 211, the memory 212, the stock pile device 213 and the image converter 3301 are connected via the core bus 214. It is not necessary to connect the communication control unit 208 to the network 215 in case the client terminal, etc. are not operated from the external device 207. The storing device 213 can be removed from the image pickup apparatus, and it can be made a done object. It is not necessary that the television monitor 205 should connect in case it is not output to a television. And, a television output unit can be omitted.

Figure 33:
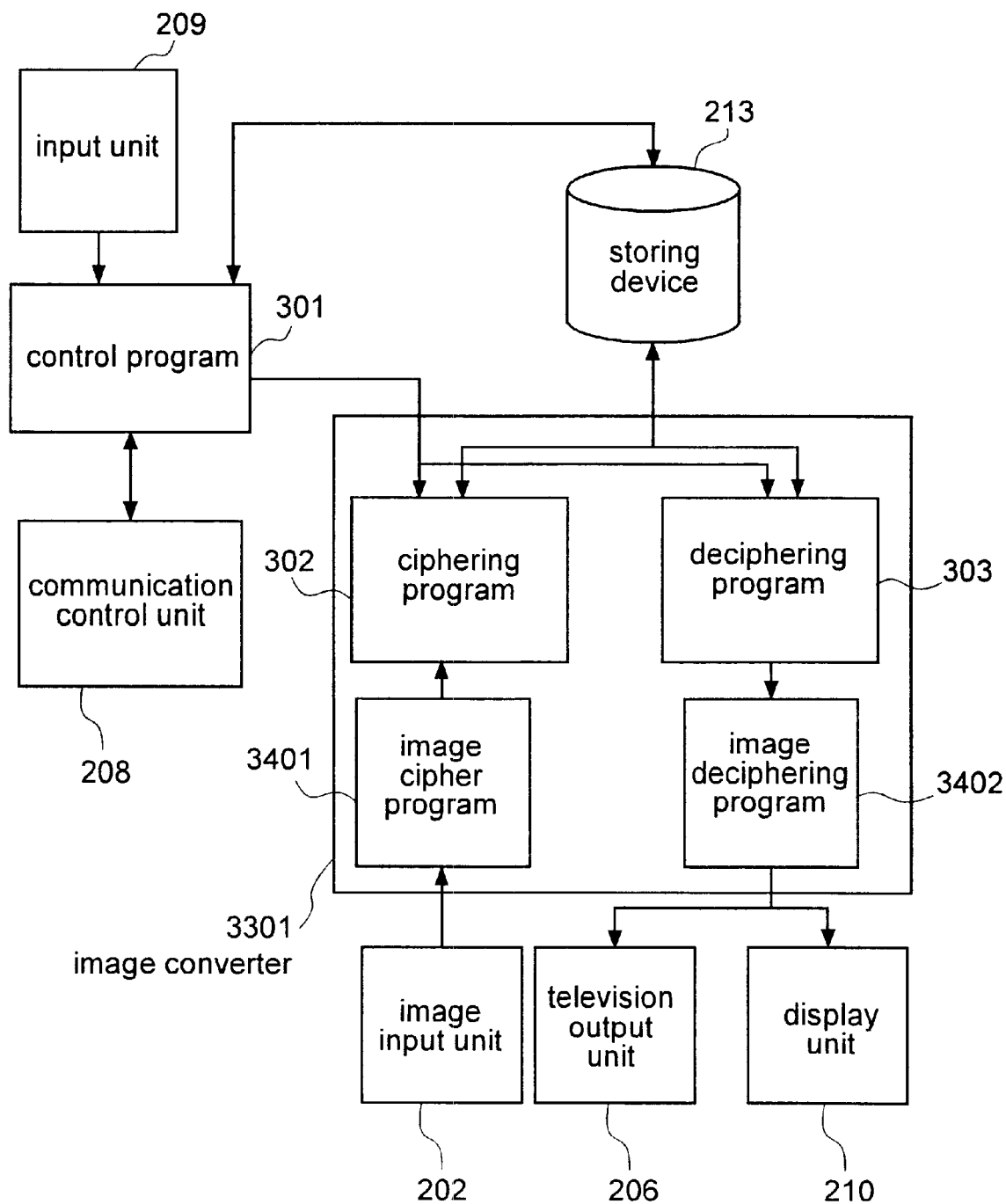
FIG. 33 is a diagram showing a program constitution in the image converter in FIG. 32.

FIG. 33 shows an image program constitution in an image converter 3301 of the image pickup apparatus of FIG. 32. 202, 206, 208, 210 and 213 is the same as FIG. 2, and 301–303 is the same as FIG. 3. The cipher by the image cipher program 3401 and the input to enciphering program 302 are done for the image input into image converter 3301 from the image input unit. The image data that a cipher happened deciphered the image data from the cipher deciphering program is deciphered in image deciphering program 3402 and is output to a television output unit or a display unit.

Because according to the above example, coding and enciphering, cryptograph deciphering of an image and deciphering of an image are executed with 1 equipment, before enciphering enciphered image data, it does not flow on the internal bus. Therefore, an image data receiving person can certify a change addition of image data by a photographing person. The image pickup equipment that can certify an addition of a change by image data by a photographing person like the above explanation in the image data receiving person can be provided by the present invention.

And, the image pickup equipment and the image data use system that can certify an addition of a change by image data by an image data receiving person in the photographing person and a third party can be provided.

What is claimed is:

1. A digital camera comprising:
   an image input unit for receiving an optical image;
   an image code device for transforming the optical image to digital image data;
   a processor; and
   a storage device;
   wherein said processor ciphers the digital image data to provide encrypted digital image data before storing the digital image data into said storage device and transfers the encrypted digital image data to said storage device,
   further comprising a memory,
   wherein said memory includes information for indicating a relation among the encrypted digital image data, encryption method which is used for ciphering the digital image data and encryption key which is used for deciphering of the encrypted digital image data,
   wherein said processor uses one of a plurality of the encryption methods based on an instruction of a user.

2. The digital camera according to claim 1, wherein said memory is prohibited from being removed from the digital camera.

3. The digital camera according to claim 1, further comprising:
- a communication control unit; and
- an interface connected to an external device used by the user,
- wherein said communication control unit sends the encrypted digital image data to the external device via the interface in accordance with an instruction received from the external device.

4. The digital camera according to claim 3,
- wherein said processor adds a check to the digital image data before ciphering.

5. A system comprising:
- a digital camera; and
- a device connected to said digital camera via a network,
- wherein said device sends a message to said digital camera,
- wherein said digital camera sends encrypted digital image data to the device via the network in accordance with said message,
- wherein, if said device has an encryption key which is used for deciphering said encrypted digital image data, said device deciphers said encrypted digital image data to provide the digital image data and displays the digital image data, and if said device doesn't have the encryption key, said device displays notice that the encrypted digital image data is unusable.

6. The system according to claim 5,
- wherein said digital camera provides digital image data and embeds a check code into the digital image data before providing the encrypted digital image data,
- wherein said device checks the check code included in the digital image data and displays a notice of falsification if a result of the check is error.

* * * * *